US008612727B2

(12) United States Patent
McDonald et al.

(10) Patent No.: US 8,612,727 B2
(45) Date of Patent: Dec. 17, 2013

(54) APPARATUS AND METHOD FOR MARKING START AND END BYTES OF INSTRUCTIONS IN A STREAM OF INSTRUCTION BYTES IN A MICROPROCESSOR HAVING AN INSTRUCTION SET ARCHITECTURE IN WHICH INSTRUCTIONS MAY INCLUDE A LENGTH-MODIFYING PREFIX

(75) Inventors: Thomas C. McDonald, Austin, TX (US); John L. Duncan, Austin, TX (US)

(73) Assignee: VIA Technologies, Inc., New Taipei (TW)

( * ) Notice: Subject to any disclaimer, the term of this patent is extended or adjusted under 35 U.S.C. 154(b) by 949 days.

(21) Appl. No.: 12/571,997

(22) Filed: Oct. 1, 2009

(65) Prior Publication Data

US 2010/0299503 A1 Nov. 25, 2010

Related U.S. Application Data

(60) Provisional application No. 61/228,296, filed on Jul. 24, 2009, provisional application No. 61/179,616, filed on May 19, 2009.

(51) Int. Cl.
*G06F 9/30* (2006.01)
(52) U.S. Cl.
USPC .......................................... 712/210; 712/212
(58) Field of Classification Search
None
See application file for complete search history.

(56) References Cited

U.S. PATENT DOCUMENTS

| 5,537,629 | A | 7/1996 | Brown et al. |
| 5,758,116 | A * | 5/1998 | Lee et al. ...................... 712/210 |
| 5,826,053 | A | 10/1998 | Witt |
| 5,850,532 | A | 12/1998 | Narayan et al. |
| 6,260,134 | B1 | 7/2001 | Zuraski, Jr. et al. |
| 6,308,257 | B1 | 10/2001 | Theogarajan et al. |
| 6,496,923 | B1 | 12/2002 | Gruner et al. |
| 7,640,417 | B2 | 12/2009 | Madduri |
| 2004/0128479 | A1 * | 7/2004 | Madduri et al. .............. 712/210 |

OTHER PUBLICATIONS

Fog, Agner. "The Microarchitecture of Intel and AMD CPU's: An Optimization Guide for Assembly Programmers and Compiler Makers." Copenhagen University College of Engineering. Last Updated May 5, 2009 p. 93.
Intel 64 and IA-32 Architectures Optimization Reference Manual. Mar. 2009. pp. 3-21 to 3-23 and 12-5, downloaded from http://www.intel.com/Assets/PDF/manual/248966.pdf.

* cited by examiner

*Primary Examiner* — Andrew Caldwell
*Assistant Examiner* — Benjamin Geib
(74) *Attorney, Agent, or Firm* — E. Alan Davis; James W. Huffman

(57) ABSTRACT

An apparatus in a microprocessor that has an instruction set architecture in which instructions may include a length-modifying prefix used to select an address/operand size other than a default address/operand size, wherein the apparatus marks the start byte and the end byte of each instruction in a stream of instruction bytes. Decode logic decodes each instruction byte of a predetermined number of instruction bytes to determine whether the instruction byte specifies a length-modifying prefix and generates a start mark and an end mark for each of the instruction bytes based on an address/operand size. Operand/address size logic provides the default operand/address size to the decode logic to use to generate the start and end marks during a first clock cycle during which the decode logic decodes the predetermined number of instruction bytes. If during the first clock cycle and any of N subsequent clock cycles the decode logic indicates that one of the predetermined number of instruction bytes specifies a length-modifying prefix, the operand/address size logic provides to the decode logic on the next clock cycle the address/operand size specified by the length-modifying prefix to use to generate the start and end marks.

23 Claims, 16 Drawing Sheets

*Fig. 3* accumulated prefix information

238

| OS 302 |
|---|
| AS 304 |
| REX present 306 |
| REX.W 308 |
| REX.R 312 |
| REX.X 314 |
| REX.B 316 |
| REP 318 |
| REPNE 322 |
| LOCK 324 |
| segment override present 326 |
| encoded segment override [2:0] 328 |
| any prefix present 332 |

S = start byte; E = end byte; P = prefix byte; instructions are denoted by lower case letters a, b, c, d partial LEN = 14 remaining LENb = 1

I1 = b; I2 = c; I3 = d

APPARATUS AND METHOD FOR MARKING START AND END BYTES OF INSTRUCTIONS IN A STREAM OF INSTRUCTION BYTES IN A MICROPROCESSOR HAVING AN INSTRUCTION SET ARCHITECTURE IN WHICH INSTRUCTIONS MAY INCLUDE A LENGTH-MODIFYING PREFIX

CROSS REFERENCE TO RELATED APPLICATION(S)

This application claims priority based on the following U.S. Provisional Applications, which are hereby incorporated by reference in their entirety.

| Ser. No. | Filing Date | Title |
| --- | --- | --- |
| 61/179,616 | May 19, 2009 | APPARATUS AND METHOD FOR MARKING START AND END BYTES OF INSTRUCTIONS IN A STREAM OF INSTRUCTION BYTES IN A MICROPROCESSOR HAVING AN INSTRUCTION SET ARCHITECTURE IN WHICH INSTRUCTIONS MAY INCLUDE A LENGTH-MODIFYING PREFIX |
| 61/228,296 | Jul. 24, 2009 | APPARATUS FOR EFFICIENTLY DETERMINING INSTRUCTION LENGTH WTHIN A STREAM OF X86 INSTRUCTION BYTES |

This application is related to the following Applications which are concurrently filed herewith, each of which was owned or subject to an obligation of assignment to VIA Technologies, Inc. or one of its wholly-owned subsidiaries at the time the invention claimed herein was made:

| Ser. No. | Filing Date | Title |
| --- | --- | --- |
| 12/572,002 | herewith | PREFIX ACCUMULATION FOR EFFICIENT PROCESSING OF INSTRUCTIONS WITH MULTIPLE PREFIX BYTES |
| 12/572,045 | herewith | APPARATUS FOR EFFICIENTLY DETERMINING INSTRUCTION LENGTH WITHIN A STREAM OF X86 INSTRUCTION BYTES |
| 12/572,024 | herewith | EARLY RELEASE OF CACHE DATA WITH START/END MARKS WHEN INSTRUCTIONS ARE ONLY PARTIALLY PRESENT |
| 12/572,052 | herewith | IMPROVED INSTRUCTION EXTRACTION THROUGH PREFIX ACCUMULATION |
| 12/572,058 | herewith | BAD BRANCH PREDICTION DETECTION, MARKING, AND ACCUMULATION FOR FASTER INSTRUCTION STREAM PROCESSING |

FIELD OF THE INVENTION

The present invention relates in general to the field of microprocessors, and particularly to instruction extraction from a stream of instruction bytes within a microprocessor having an instruction set architecture that allows variable length instructions.

BACKGROUND OF THE INVENTION

Microprocessors include one or more execution units that perform the actual execution of instructions. Superscalar processors include the ability to issue multiple instructions per clock cycle to the various execution units to improve the throughput, or average instructions per clock cycle, of the processor. However, the instruction fetch and decoding functions at the top of the microprocessor pipeline must provide an instruction stream to the execution units at a sufficient rate in order to utilize the additional execution units and actually improve the throughput. The x86 architecture makes this task more difficult because the instructions of the instruction set are not fixed length; rather, the length of each instruction may vary, as discussed in more detail below. Thus, an x86 microprocessor must include an extensive amount of logic to process the incoming stream of instruction bytes to determine where each instruction starts and ends. Therefore, ways are needed to improve the rate at which an x86 microprocessor can parse a stream of indistinct instruction bytes into distinct instructions.

BRIEF SUMMARY OF INVENTION

In one aspect the present invention provides an apparatus in a microprocessor that has an instruction set architecture in which instructions may include a length-modifying prefix used to select an address/operand size other than a default address/operand size, wherein the apparatus configured to mark the start byte and the end byte of each instruction in a stream of instruction bytes. The apparatus includes decode logic configured to decode each instruction byte of a predetermined number of instruction bytes of the stream to determine whether the instruction byte specifies a length-modifying prefix and configured to generate a start mark and an end mark for each of the instruction bytes based on an address/operand size. The apparatus also includes operand/address size logic, coupled to the decode logic, configured to provide the default operand/address size to the decode logic to use to generate the start and end marks during a first clock cycle during which the decode logic decodes the predetermined number of instruction bytes. If during the first clock cycle and any of N subsequent clock cycles the decode logic indicates that one of the predetermined number of instruction bytes of the stream specifies a length-modifying prefix, the operand/address size logic is further configured to provide to the decode logic on the next clock cycle the address/operand size specified by the length-modifying prefix to use to generate the start and end marks.

In another aspect, the present invention provides, in a microprocessor that has an instruction set architecture in which instructions may include a length-modifying prefix used to select an address/operand size other than a default address/operand size, a method for marking the start byte and the end byte of each instruction in a stream of instruction bytes. The method includes during a first clock cycle, decoding each instruction byte of a predetermined number of instruction bytes of the stream to determine whether the instruction byte is a length-modifying prefix. The method also includes, if none of the decoded instruction bytes is a length-modifying prefix, generating a correct start mark and a correct end mark for each instruction in the predetermined number of instruction bytes of the stream based on the default address/operand size, during the first clock cycle. The method also includes, if one or more of the decoded instruction bytes is a length-modifying prefix, generating the correct start mark and the correct end mark for each instruction in the predetermined number of instruction bytes of the stream based on the address/operand sizes indicated by the length-modifying prefixes, during an Nth clock cycle subsequent to the first clock cycle. N is the number of instructions of the predetermined number of instruction bytes of the stream having at least one length-modifying prefix.

In yet another aspect, the present invention provides a computer program product for use with a computing device, the computer program product comprising a computer usable storage medium having computer readable program code embodied in the medium for specifying, in a microprocessor that has an instruction set architecture in which instructions may include a length-modifying prefix used to select an address/operand size other than a default address/operand size, an apparatus configured to mark the start byte and the end byte of each instruction in a stream of instruction bytes. The computer readable program code includes first program code for specifying decode logic configured to decode each instruction byte of a predetermined number of instruction bytes of the stream to determine whether the instruction byte specifies a length-modifying prefix and configured to generate a start mark and an end mark for each of the instruction bytes based on an address/operand size. The computer readable program code also includes second program code for specifying operand/address size logic, coupled to the decode logic, configured to provide the default operand/address size to the decode logic to use to generate the start and end marks during a first clock cycle during which the decode logic decodes the predetermined number of instruction bytes. If during the first clock cycle and any of N subsequent clock cycles the decode logic indicates that one of the predetermined number of instruction bytes of the stream specifies a length-modifying prefix, the operand/address size logic is further configured to provide to the decode logic on the next clock cycle the address/operand size specified by the length-modifying prefix to use to generate the start and end marks.

BRIEF DESCRIPTION OF THE DRAWINGS

FIG. 3 is an illustration of the accumulated prefix information 238 of FIG. 2.

DETAILED DESCRIPTION OF THE INVENTION

Figure 1:
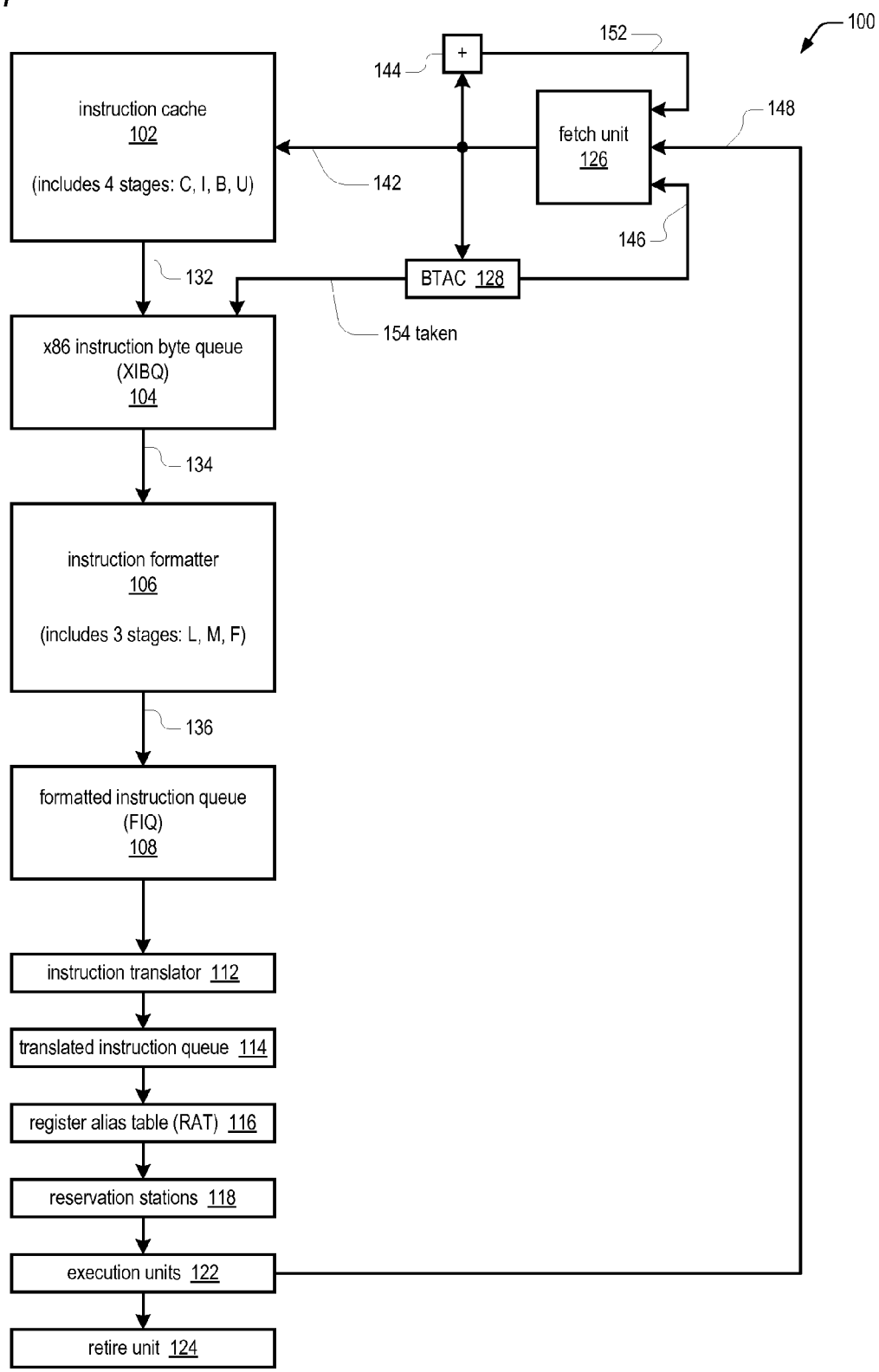
FIG. 1 is a block diagram illustrating a microprocessor according to the present invention.

Referring now to FIG. 1, a block diagram illustrating a microprocessor 100 according to the present invention is shown. The microprocessor 100 includes a pipeline of stages or functional units, including a four-stage instruction cache 102, an x86 instruction byte queue (XIBQ) 104, an instruction formatter 106 (which includes three stages denoted L, M, and F), a formatted instruction queue 108, an instruction translator 112, a translated instruction queue 114, a register alias table 116, reservation stations 118, execution units 122, and a retire unit 124. The microprocessor 100 also includes a fetch unit 126 that provides a fetch address 142 to the instruction cache 102 to select a cache line of instruction bytes 132 that are provided to the XIBQ 104. The microprocessor 100 also includes an adder 144 that increments the current fetch address 142 to generate a next sequential fetch address 152 that is provided back to the fetch unit 126. The fetch unit 126 also receives a predicted target address 146 from a branch target address cache (BTAC) 128. Finally, the fetch unit 126 receives an executed target address 148 from the execution units 122.

The XIBQ 104 is a queue of entries, each of which holds sixteen bytes of data from the instruction cache 102. Additionally, each XIBQ 104 entry holds pre-decoded information associated with the data bytes. The pre-decode information is generated as the data bytes flow from the instruction cache 102 to the XIBQ 104. The cache data 132 that comes from the XIBQ 104 is simply a stream of instruction bytes that comes in sixteen byte blocks, and it is unknown where a given x86 instruction begins or ends within the stream or within a given block. The job of the instruction formatter 106 is to determine the beginning and ending byte of each instruction within the stream and thereby break up the stream of bytes into a stream of x86 instructions, which is provided to and stored in the formatted instruction queue 126 for processing by the remainder of the microprocessor 100 pipeline. When a reset occurs or a control flow instruction (e.g., a jump instruction, subroutine call instruction, or return from subroutine instruction) is executed or predicted, the reset address or the branch target address is provided to the instruction formatter 106 as an instruction pointer which enables the instruction formatter 106 to determine the first byte of the first valid instruction within the current sixteen byte block of the instruction stream. Thereafter, the instruction formatter 106 determines the beginning of the next instruction based on the location of the beginning of the first target instruction plus the length of the first target instruction. The instruction formatter 106 continues this process until another control flow instruction is executed or predicted.

The BTAC 128 also provides taken indicators 154 to the XIBQ 104. There is one taken indicator 154 that corresponds to each of the instruction bytes provided by the instruction cache 102 to the XIBQ 104. Each taken indicator 154 indicates whether or not the BTAC 128 predicted that there is a branch instruction that will be taken present in the line of instruction bytes provided to the XIBQ 104; if so, the fetch unit 126 selects the target address 146 provided by the BTAC 128. Specifically, the BTAC 128 outputs a true value for the taken bit 154 associated with the first byte of the branch instruction (even if the first byte is a prefix byte) and outputs a false value for all other bytes of the instruction.

The microprocessor 100 is an x86 architecture microprocessor 100. A microprocessor is an x86 architecture processor if it can correctly execute a majority of the application programs that are designed to be executed on an x86 microprocessor. An application program is correctly executed if its expected results are obtained. One characteristic of the x86 architecture is that the length of instructions in the instruction set architecture is variable, rather than a fixed length as in some instruction set architectures. Furthermore, even for a given x86 opcode, the length of the instruction may vary due to the presence or absence of prefixes to the opcode byte. Still further, the length of some instructions is a function of the default operand and/or address size based on a mode in which the microprocessor 100 is operating (e.g., the D bit of the code segment descriptor, or whether the microprocessor 100 is operating in IA-32e or 64-bit mode). Finally, instructions may include a length-modifying prefix that is used to select an address/operand size other than a default address/operand size. For example, the operand size (OS) prefix (0x66), address size (AS) prefix (0x67), and REX.W bit (bit 3) of the REX prefix (0x4x) may be used to alter the default address/operand size. Intel refers to these prefixes as length-changing prefixes (LCP), which are referred to herein as length-modifying prefixes (LMP). The format and length of an x86 instruction is well-known and described in detail in Chapter 2 of the IA-32 Intel Architecture Software Developer's Manual, Volume 2A: Instruction Set Reference, A-M, June 2006, which is hereby incorporated by reference in its entirety for all purposes.

Intel states: "When the predecoder encounters an LCP in the fetch line, it must use a slower length decoding algorithm. With the slower length decoding algorithm, the predecoder decodes the fetch in 6 cycles, instead of the usual 1 cycle. Normally queueing throughout of (sic) the machine pipeline generally cannot hide LCP penalties." See Intel® 64 and IA-32 Architectures Optimization Reference Manual, March 2009, pages 3-21 to 3-23.

Figure 2:
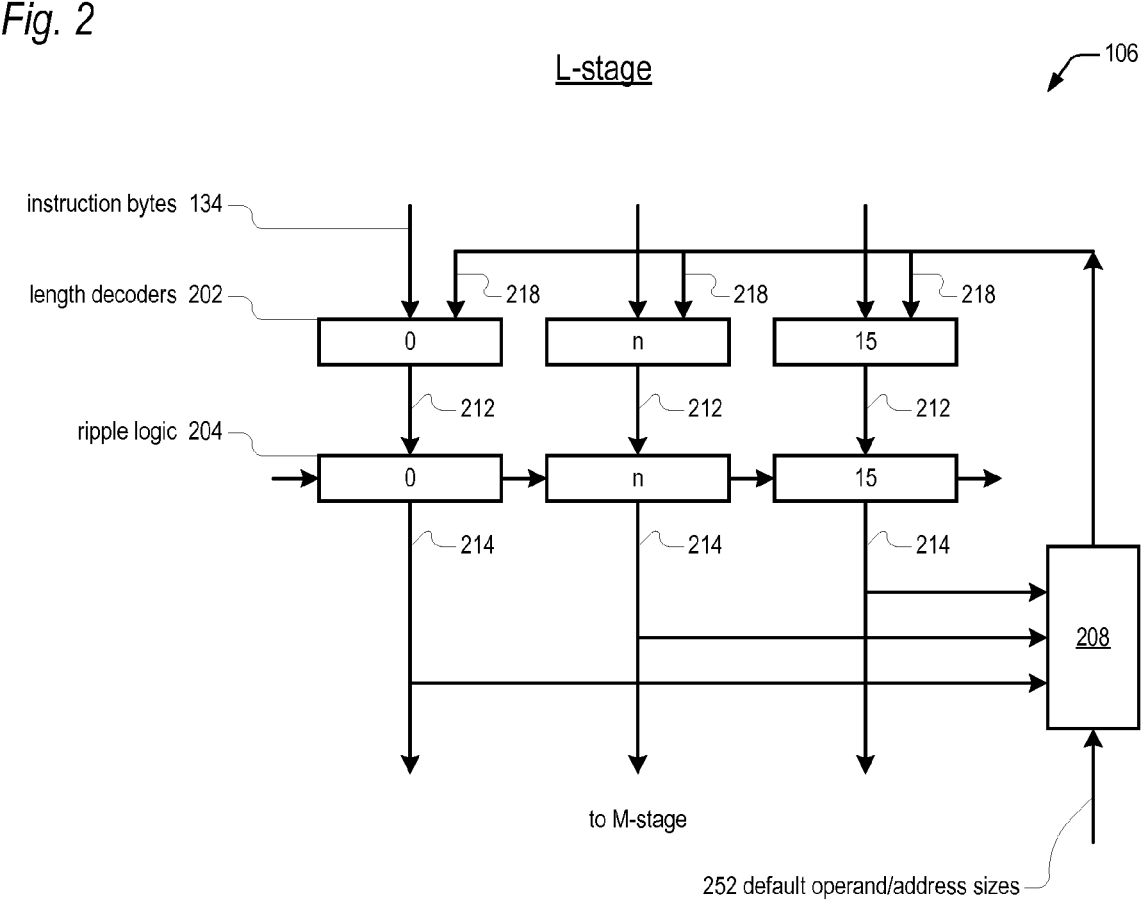
FIG. 2 is a block diagram illustrating the L-stage of the instruction formatter of FIG. 1.
Figure 2:
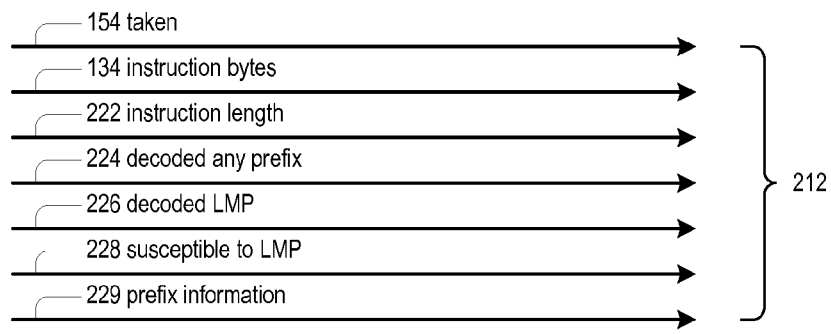
Figure 2:
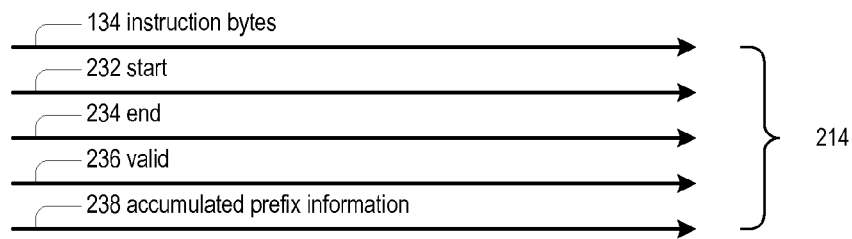

Referring now to FIG. 2, a block diagram illustrating the L-stage of the instruction formatter 106 of FIG. 1 according to the present invention is shown. The instruction formatter 106 includes length decoders 202, whose outputs 212 are coupled to ripple logic 204, whose outputs 214 are coupled to control logic 208 and which are also provided to the M-stage of the instruction formatter 106. In one embodiment, the length decoders 202 generate their outputs 212 during a first phase of a two-phase clock signal of the microprocessor 100, and the ripple logic 204 generates its outputs 214 during a second phase of the two-phase clock signal.

The length decoders 202 receive the instruction bytes 134 from the XIBQ 104 of FIG. 1. In one embodiment, each entry of the XIBQ 104 is sixteen bytes wide and there are sixteen corresponding length decoders 202, denoted 0 through 15 in FIG. 2. Each of the length decoders 202 receives and decodes its corresponding instruction byte from the lowest XIBQ 104 entry. Additionally, each length decoder 202 receives and decodes the next three adjacent instruction bytes. In the case of the last three length decoders 202, they receive one or more of the instruction bytes from the next-to-lowest XIBQ 104 entry. (If the next-to-lowest XIBQ 104 entry is not valid, the three lowest length decoders 202 may have to wait until a subsequent clock cycle to generate valid outputs). This enables the length decoder 202 to determine and output the instruction length 222 for the instructions contained within the lowest XIBQ 104 entry. In one embodiment, the instruction length 222 specifies the number of bytes that make up the instruction excluding prefix bytes. That is, the instruction length 222 specifies the number of bytes starting with the opcode byte through the last byte of the instruction. Specifically, the instruction length 222 output by the instruction decoder 108 corresponding to the first instruction byte of the instruction specifies the instruction length 222.

To generate the instruction length 222, the length decoders 202 also use the operand and address sizes 218 received from the control logic 208. The control logic 208 outputs an operand and address size 218 for each instruction byte 134. The control logic 208 determines the operand and address sizes 218 based on the current microprocessor 100 default operand and address sizes 252 and on the ripple logic 204 outputs 214. If the ripple logic 204 outputs 214 indicate there are no LMP included in the instruction, the control logic 208 outputs the default operand and address size to the corresponding length decoder 202 for each byte of the instruction. However, if the ripple logic 204 outputs 214 indicate that the instruction includes one or more LMP, the control logic 208 outputs an operand and address size 218 to the corresponding length decoder 202 for each byte of the instruction based on the default sizes 252 as modified by the values of the OS 302, AS 304, and REX.W 308 bits, which are included in the accumulated prefix information 238 of the ripple logic 204 outputs 214, as shown in detail in FIG. 3.

As shown in FIG. 2, the outputs 212 of each length decoder 202 include the instruction bytes 134, the instruction length 222, a decoded any prefix indicator 224, a decoded LMP indicator 226, a susceptible to LMP indicator 228, and prefix information 229.

The decoded any prefix indicator 224 is true if the length decoder 202 decodes a value that corresponds to any x86 prefix, regardless of whether it was a LMP; otherwise, it is false.

The decoded LMP indicator 226 is true if the length decoder 202 decodes a value that corresponds to any x86 LMP, namely an OS prefix (0x66), AS prefix (0x67), or REX.W prefix (0x48-0x4F); otherwise, it is false.

The susceptible to LMP indicator 228 is false if this byte is an opcode byte value whose instruction length cannot be affected by an LMP (e.g., an OS prefix is mandatory for some SIMD instructions, and therefore does not modify their length); otherwise, it is true.

The prefix information 229 comprises multiple bits that indicate whether the instruction byte has the value of one of the various x86 prefixes. The bits are similar to those shown in the accumulated prefix information 238 of FIG. 3. However, it is noted that the prefix information 229 output by the length decoder 202 only indicates a single prefix, that is, the prefix value of the single corresponding instruction byte being decoded by the length decoder 202. In contrast, the accumulated prefix information 238 indicates all prefixes present in the corresponding instruction because the ripple logic 204 accumulates all the prefix information 229 provided by all the length decoders 202 associated with the prefix bytes of the instruction.

As shown in FIG. 2, the outputs 214 of each ripple logic block 204 include the instruction bytes 134, the start bit 232, end bit 234, valid bit 236, and accumulated prefix information 238. The outputs 214 of each ripple logic block 204 are also fed to the next adjacent ripple logic block 204. In one embodiment, the sixteen ripple logic blocks 204 are organized as four custom logic blocks that each process four instruction bytes and their associated information. Each ripple logic block 204 also outputs the corresponding instruction byte.

The start bit 232 is true if this byte is the opcode byte of the instruction, i.e., the first byte of the instruction that is not a prefix byte. The instruction formatter 106 increments a pointer past all prefix bytes such that when the pointer points to a non-prefix byte, the pointer is then pointing to the operand byte of the instruction.

The end bit 234 is true if this byte is the last byte of the instruction.

Beginning with the first of the sixteen valid bits 236 output by the ripple logic 204, each valid bit 236 is true until the first unprocessed LMP is encountered.

The accumulated prefix information 238 is shown in FIG. 3 and is discussed above. Advantageously, the control logic 208 uses the accumulated prefix information 238 in conjunction with the valid bits 236 to determine whether to use the default size values 252 or to modify them.

It is noted that the outputs 212 of the length decoders 202 are tentative. That is, they are generated without yet knowing where the corresponding instruction byte is located within its instruction. In particular, the prefix-related indicators 224/226/228/229 are generated based on the assumption that the byte is a valid prefix, which may turn out to be an incorrect assumption. Thus, for example, the byte may have a prefix value but just turn out to be a byte of a displacement that happens to be the same value as an LMP. For example, 0x67 is the value of the AS prefix, which is a LMP; however, an address displacement byte or an immediate data value byte or a Mod R/M byte or a SIB byte of the instruction—each of which is not a prefix byte—may also have the value 0x67. It is not until all LMP, if any, within the current block of instruction bytes has been processed that the outputs 212 and 214 are accurate for all the bytes of the block.

If there are no LMP in any of the instruction bytes of the XIBQ 104 entry being decoded in the current clock cycle, then the L-stage is capable of generating the ripple logic 204 outputs 214 (particularly, the start 232 and end 234 bits) for the entire entry in a single clock cycle. If there are one or more instructions within the current XIBQ 104 entry being decoded that have an LMP, then the number of clock cycles required to generate the ripple logic 204 outputs 214 with accurate start bits 232 and end bits 234 is N+1, where N is the number of instructions within the current XIBQ 104 entry having at least one LMP. Advantageously, the L-stage is capable of doing this regardless of the number of prefixes included in any of the instructions of the entry. This is illustrated with respect to the flowchart of FIG. 4. The control logic 208 includes state that indicates which bytes of the current block of instruction bytes have been processed and which have not. This state enables the control logic 208 to generate the valid bits 236 and to generate the operand and address sizes 218 for each instruction byte. Because of the iterative nature of the processing of a block of instruction bytes that has one or more instructions that include at least one LMP, on the first clock cycle the instruction length 222 and the start 232 and end 234 bits may not be correct for the first instruction that includes an LMP; however, on the next clock cycle the instruction length 222 and the start 232 and end 234 bits will be correct for that instruction and any adjacent instructions that do not have an LMP; and, on each subsequent clock cycle the instruction length 222 and the start 232 and end 234 bits will be correct for the next first instruction that includes an LMP and any adjacent instructions that do not have an LMP, if any, and so forth. In one embodiment, the state comprises a 16-bit register that indicates whether each corresponding instruction byte has been processed.

Figure 4:
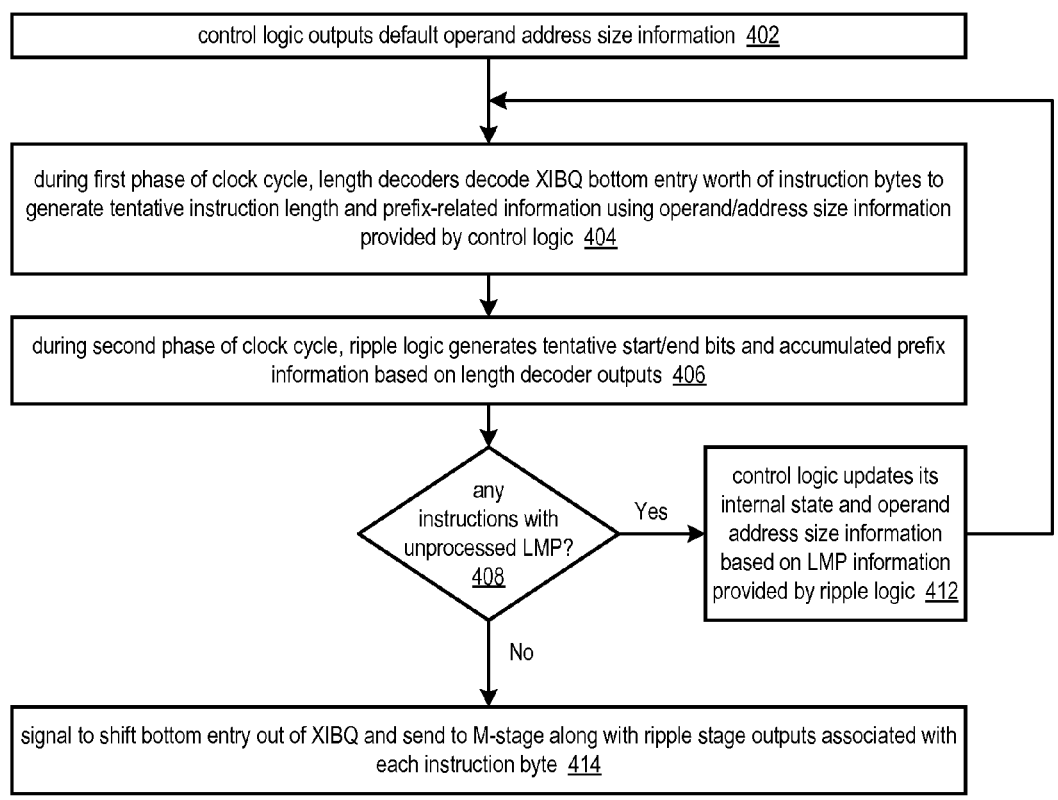
FIG. 4 is a flowchart illustrating operation of the microprocessor of FIG. 1.

Marking Start and End Bytes of Instructions that Include a Length-Modifying Prefix Referring now to FIG. 4, a flowchart illustrating operation of the microprocessor 100 of FIG. 1 is shown. Flow begins at block 402.

At block 402, control logic 208 outputs the default operand and address size information 218 to the length decoders 202. Flow proceeds to block 404.

At block 404, during the first phase of the clock cycle, the length decoders 202 decode the instruction bytes in the bottom entry of the XIBQ 104 to generate their outputs 212 using the operand and address size information 218 provided by the control logic 208. As described above, the length decoder 202 outputs 212 includes a tentative instruction length 222 and prefix-related information 224/226/228/229 of FIG. 2 for each instruction byte of the XIBQ 104 bottom entry. Flow proceeds to block 406.

At block 406, during the second phase of the clock cycle, the ripple logic 204 generates its outputs 214 based on the outputs 212 of the length decoders 202. As described above, the ripple logic 204 outputs 214 include start bits 232, end bits 234, and accumulated prefix information 238 of FIG. 3. Flow proceeds to decision block 408.

At decision block 408, the control logic 208 examines the ripple logic 204 outputs 214 to determine whether there are any instructions within the bottom entry of the XIBQ 104 that include at least one unprocessed LMP. If so, flow proceeds to block 412; otherwise, flow proceeds to block 414.

At block 412, the control logic 208 updates its internal state and its operand and address size information based on the accumulated prefix information 238 provided by the ripple logic 204. Flow returns to block 404 to perform another iteration of processing on the bottom entry of instruction bytes using the new LMP information.

At block 414, the control logic 208 determines that the bottom entry of instruction bytes has been fully processed and signals to shift the bottom entry of instruction bytes out of the XIBQ 104 and send them to the M-stage along with the ripple logic 204 outputs 214 associated with each instruction byte 134. In particular, as discussed above, the ripple logic 204 outputs 214 include the start bits 232 and end bits 234, which indicate the boundaries of each instruction within the instruction stream provided by the instruction cache 102 and advantageously enable the M-stage and F-stage of the instruction formatter 106 to further process the instruction stream and place discrete instructions into the FIQ 108 for processing by the instruction translator 112. Flow ends at block 414.

As may be observed from the foregoing, advantageously the L-stage is capable of generating the start 232 and end 234 bits for an entire XIBQ 104 entry in a single clock cycle if there are no LMP in any of the instruction bytes, and if there are one or more instructions within the XIBQ 104 entry that have an LMP, then the number of clock cycles required to generate the start bits 232 and end bits 234 is N+1, where N is the number of instructions within the current XIBQ 104 entry having at least one LMP, and the L-stage is capable of doing this regardless of the number of prefixes included in any of the instructions of the entry.

Prefix Accumulation for Efficient Processing of Instructions with Multiple Prefix Bytes The x86 architecture permits an instruction to include anywhere between 0 and 14 prefix bytes. This creates a difficult task for the front end of the pipeline to process the stream of instruction bytes. Historically, there has been a penalty associated with processing instructions that have more than a relatively small number of prefix bytes. Intel has stated with respect to its ATOM microarchitecture: "Instructions . . . having more than three prefixes will results (sic) in a MSROM transfer, experiencing two cycles of delay in the front end." See Intel® 64 and IA-32 Architectures Optimization Reference Manual, March 2009, page 12-5. Additionally, another researcher has stated: "Instructions with many prefixes take extra time to decode. The instruction decoder on P4 can handle one prefix per clock cycle. An instruction with more than one prefix will thus take one clock cycle for each prefix to decode on the P4" and "The instruction decoder on P4E can handle two prefixes per clock cycle. Thus, an instruction with up to two prefixes can be decoded in a single clock cycle, while an instruction with three or four prefixes is decoded in two clock cycles. This capability was introduced in the P4E because instructions with two prefixes are common in 64 bit mode (e.g. operand size prefix and REX prefix)." The microarchitecture of Intel and AMD CPU's, Agner Fog, Copenhagen University College of Engineering, last updated 2009-05-05, page 93.

However, embodiments described herein can handle all the prefix bytes of an instruction that the architecture permits (up to 14) without incurring a delay, i.e., penalty, independent of the number of prefix bytes (as long as the prefixes are not length-modifying prefixes (LMP), in which case there is incurred one additional clock cycle per instruction within the line that has one or more LMP, as described above). This is accomplished because of the way the length decoders 202 generate the prefix information 229 and the way the ripple logic 204 operates to accumulate the prefix information 229 of an instruction into the accumulated prefix information 238 onto the opcode byte of the instruction, as will now be described.

Figure 5:
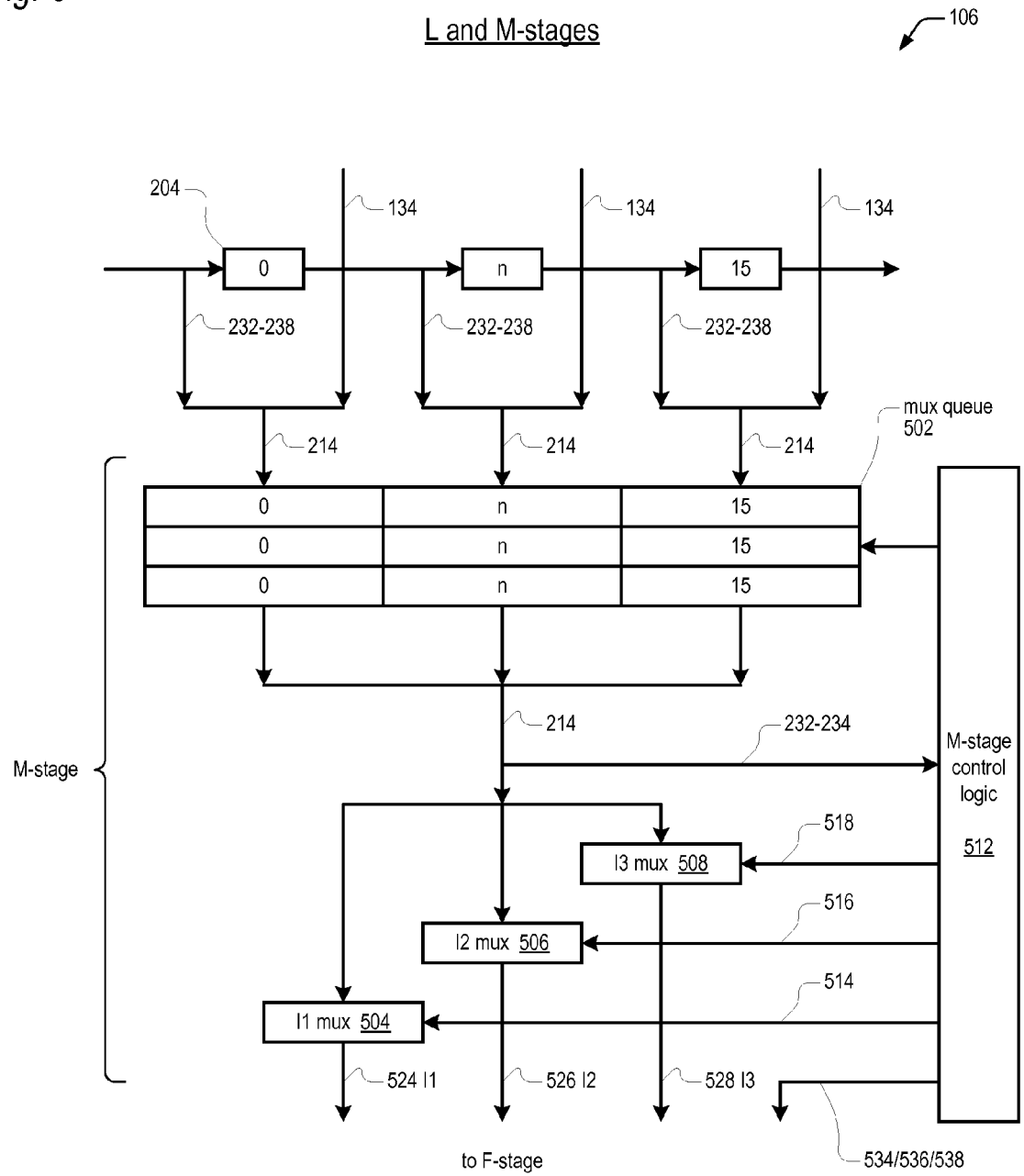
FIG. 5 is a block diagram illustrating portions of the L-stage and M-stage of the instruction formatter of FIG. 1 according to the present invention.

Referring now to FIG. 5, a block diagram illustrating portions of the L-stage and M-stage (mux stage) of the instruction formatter 106 of FIG. 1 according to the present invention is shown. The M-stage includes a mux queue 502. In one embodiment, the mux queue 502 includes four entries, each entry storing sixteen bytes. The next empty entry of the mux queue 502 receives the associated outputs 214 of the ripple logic blocks 204 of FIG. 2, which includes the instruction bytes 134 and the start bit 232, end bit 234, and accumulated prefix information 238.

The M-stage also includes M-stage control logic 512 that receives the start/end bits 232/234 from each of the corresponding bytes of the bottom mux queue 502 entry and (in one embodiment) from the first ten bytes of the next-to-bottom mux queue 502 entry. Using the start/end bits 232/234, the M-stage control logic 512 controls three sets of muxing logic denoted I1 mux 504, I2 mux 506, and I3 mux 508. The I1 mux 504 outputs a first instruction, denoted I1 524, to the F-stage of instruction formatter 106; the I2 mux 506 outputs a second instruction, denoted I2 526, to the F-stage; and the I3 mux 508 outputs a third instruction, denoted I3 528, to the F-stage. Additionally, the M-stage control logic 512 outputs three valid indicators 534/536/538 to indicate whether or not each of the respective first, second, and third instructions 524/526/528 is valid. Thus, the M-stage is capable of extracting from the instruction stream up to three formatted instructions and providing them to the F-stage in a single clock cycle. Other embodiments are contemplated in which the M-stage is capable of extracting and providing more than three formatted instructions to the F-stage in a clock cycle. Each of the three instructions 524/526/528 include the respective instruction bytes 134 with the prefix bytes removed and replaced by the associated accumulated prefix information 238 associated with the instruction. That is, each instruction 524/526/528 includes the opcode byte and the remainder of the instruction bytes of the instruction along with the accumulated prefix information 238. Each of the instruction muxes 504/506/508 receives the information 214 (less the start bit 232, end bit 234) from each of the corresponding bytes of the bottom mux queue 502 entry and (in one embodiment) from the first ten bytes of the next-to-bottom mux queue 502 entry in order to select and output the respective instruction 514/526/528.

Figure 6:
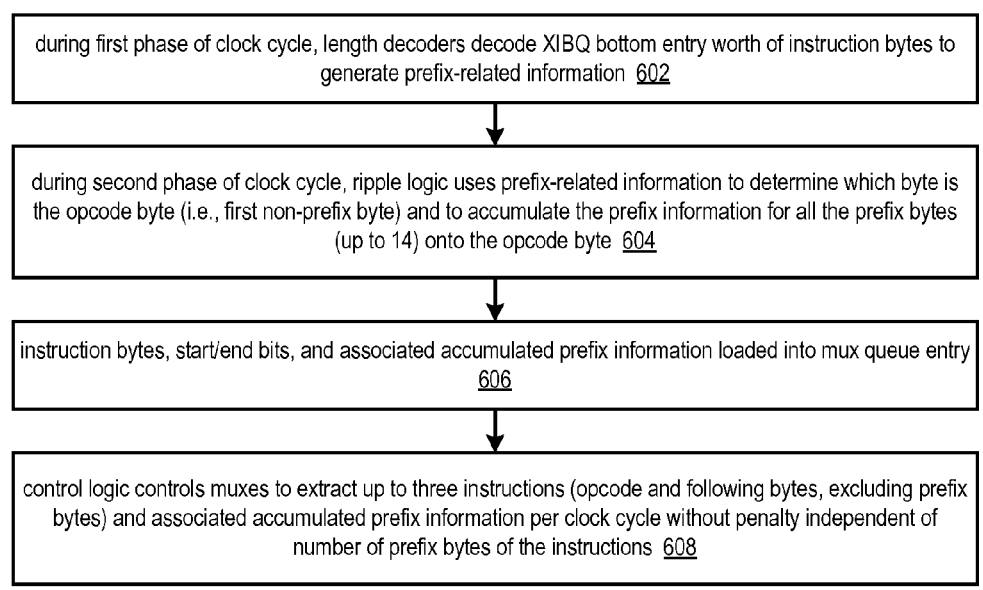
FIG. 6 is a flowchart illustrating the operation of the microprocessor elements shown in FIG. 5 to extract an instruction (in one embodiment, up to three instructions) from a stream of instruction bytes without a time penalty independent of the number of prefix bytes contained in the instruction according to the present invention.

Referring now to FIG. 6, a flowchart illustrating the operation of the microprocessor 100 elements shown in FIG. 5 to extract an instruction (in one embodiment, up to three instructions) from a stream of instruction bytes without a time penalty independent of the number of prefix bytes contained in the instruction according to the present invention is shown. Advantageously, as mentioned above, the ripple logic 204 operates to accumulate the prefix information 229 of an instruction into the accumulated prefix information 238 onto the opcode byte of the instruction. Flow begins at block 602.

At block 602, the length decoders 202 decode the stream of instruction bytes 134 to generate their outputs 212 of FIG. 2, particularly the prefix information 229, similar to the operation of block 404 above. Flow proceeds to block 604.

At block 604, the ripple logic blocks 204 use the prefix information 229 to determine which byte is the opcode byte (i.e., the first non-prefix byte) of each instruction in the stream. Additionally, the ripple logic blocks 204 accumulate the prefix information 229 for all the prefix bytes of the instruction—which may be up to 14—into accumulated prefix information 238 onto the opcode byte. In particular, the ripple logic 204 starts accumulating prefix information 229 beginning at the first prefix byte of the instruction and accumulates the prefix information 229 from byte to byte down the stream of instruction bytes until it detects that it has reached the opcode byte of the instruction. At that point, the ripple logic 204 stops accumulating the prefix information so that the accumulated prefix information 238 for the current instruction does not proceed any farther down the stream to the next instruction. The ripple logic 204 starts accumulating prefix information 229 for the next instruction beginning at its first prefix byte and stops at its opcode byte. This process occurs for each instruction in the stream. The ripple logic 204 uses the other outputs 212 of the length decoders 202 to accomplish the accumulation of the prefix information. For example, as described above, the ripple logic 204 uses the instruction lengths 222 to determine the first byte of each instruction, which may be a prefix byte from which to start the prefix information accumulation process. The ripple logic 204 additionally uses the other information 224/226/228 to determine the location of the opcode byte, which as discussed above is the first byte of the instruction that is not a prefix (indicated via the start bit 232), and the location of the last byte of the instruction (indicated via the end bit 234). Flow proceeds to block 606.

At block 606, the instruction bytes 134 and their associated start/end bits 232/234 and accumulated prefix information 238 are loaded into the next available mux queue 502 entry. In one embodiment, the steps at blocks 602, 604, and 606 are performed in a single clock cycle (assuming the instruction does not include a LMP). Flow proceeds to block 608.

At block 608, during the next clock cycle, the M-stage control logic 512 controls the instruction muxes 504/506/508 to extract up to three instructions. That is, the M-stage advantageously extracts the instructions without penalty regardless of the number of prefix bytes included in the instructions. The instructions are muxed out as distinct instructions 524/526/528 to the F-stage. In particular, the M-stage extracts the opcode byte and the following bytes of each instruction along with the associated accumulated prefix information 238. The F-stage decodes the instructions 524/526/528 with respect to their instruction type, possible exceptions, pairability, and other aspects to begin the process of translating the instructions 524/526/528. The F-stage and instruction translator 112 make use of the accumulated prefix information 238. Flow ends at block 608.

As may be seen from the above, the embodiments described herein appear to be different from the conventional designs described above. As discussed above, because the ripple logic block 204 is more complicated than it otherwise would be, namely it generates the start bit 232 that points to the opcode byte of the instruction rather than to the first actual byte of the instruction (which may be a prefix byte) and generates the accumulated prefix information 238, it is advantageously able to extract the instruction independent of the number of prefix bytes it contains without penalty (unless it includes an LMP, as discussed above). In contrast, it is inferable that the conventional processors signify the first byte of the instruction as the actual first byte, i.e., if the instruction includes a prefix byte, the prefix byte is signified as the first instruction. This appears to require them to pick off the prefix bytes in their muxing logic, which causes them to incur a penalty if the instruction has more than a relatively small number of prefix bytes.

Figure 7:
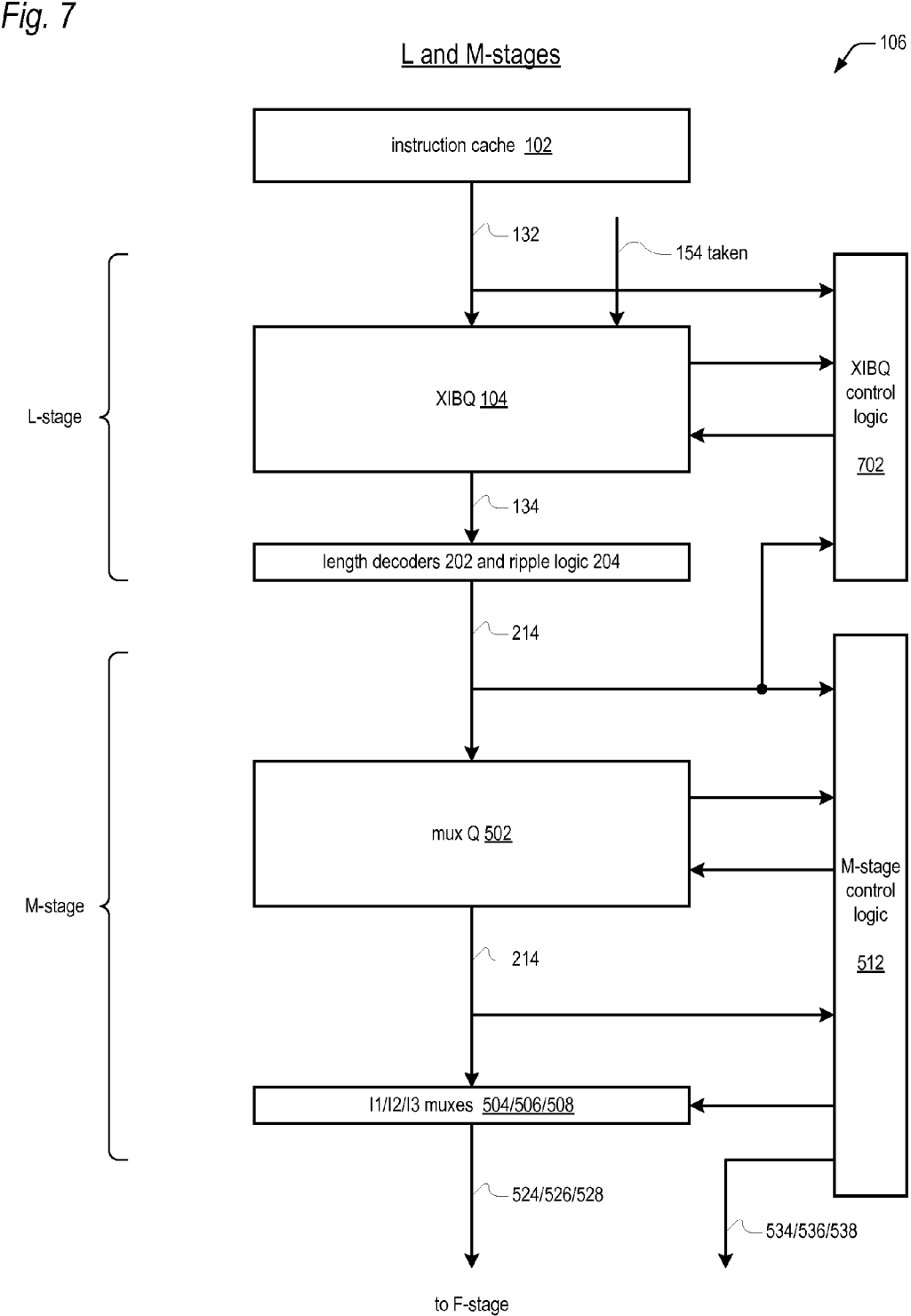
FIG. 7 is a block diagram illustrating portions of the instruction formatter of FIG. 1 according to the present invention.

Early Release of Cache Data with Start/End Marks when Instructions are Only Partially Present Referring now to FIG. 7, a block diagram illustrating portions of the instruction formatter 106 of FIG. 1 according to the present invention is shown. The instruction cache 102 provides the instruction bytes 132 to the XIBQ 104 of FIG. 1. In one embodiment, the instruction formatter 106 includes pre-decode logic (not shown) that pre-decodes the instruction bytes 132 coming out of the instruction cache 102, and the pre-decoded information is loaded into the XIBQ 104 along with the instruction bytes 132. The instruction formatter 106 includes XIBQ control logic 702 that controls the loading of entries into the XIBQ 104 and shifting of entries out of the XIBQ 104.

The length decoders 202 and ripple logic 204 of FIG. 2 receive the instruction bytes 134 from the XIBQ 104 and generate their outputs 214, which are provided to the mux Q 502 of FIG. 5 and to M-stage control logic 512 of the instruction formatter 106. The M-stage control logic 512 controls the loading of entries into the mux Q 502 and shifting of entries out of the mux queue 502. The mux queue 502 provides the information 214 from its entries to the instruction muxes 504/506/508 and to M-stage control logic 512 of FIG. 5, which controls the instruction muxes 504/506/508, as described above.

A problem occurs when: (1) the bottom entry of the XIBQ 104 contains valid instruction bytes but the next-to-bottom entry does not; (2) there is only a partial instruction (e.g., the first or first two bytes of an instruction) at the end of the entry; and (3) the partial instruction bytes do not provide enough information to the length decoders 202/ripple logic 204 to determine the length 222 (and therefore start/end bits 232/234) of the instruction, i.e., at least some of the remaining bytes of the instruction that would be in the next-to-bottom entry, but are not, are needed to determine the instruction's length. For example, assume that the start bit 232 is true for byte 15 (i.e., the last byte) of the bottom XIBQ 104 entry, and the value of the byte is 0x0F. The 0x0F value in an x86 instruction as the first non-prefix byte indicates an opcode that has an extension such that the next byte or bytes will be required to determine the actual instruction type. Thus, it is impossible from just the 0x0F byte to determine the instruction length (and in some cases it may require up to the fifth byte to determine the length). However, it might be a long time until the instruction cache 102 provides the next line of cache data to the XIBQ 104, e.g., there might have been a miss of the instruction cache 102 or a miss of the instruction translation lookaside buffer (TLB). It is desirable not to have to wait to process the other instruction bytes in the line, but instead to go ahead and process them. Furthermore, there may situations in which the microprocessor 100 depends upon consuming the instructions whose instruction bytes precede the unknown-length instruction such that if they are not processed, the microprocessor 100 may hang waiting for them to be processed. Thus, a way to proceed is needed.

Figure 8:
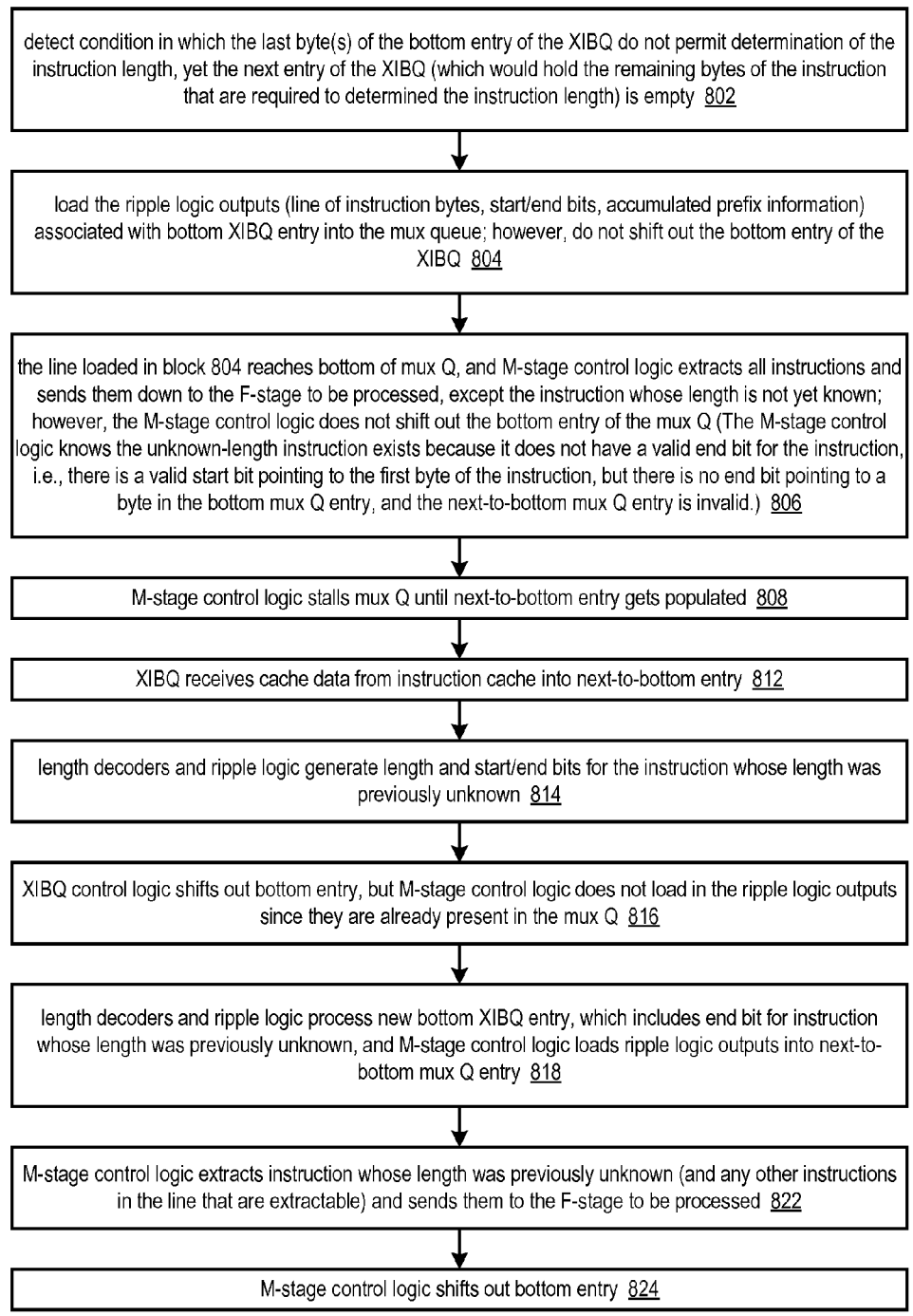
FIG. 8 is a flowchart illustrating operation of the portions of the instruction formatter of FIG. 7 according to the present invention.

Referring now to FIG. 8, a flowchart illustrating operation of the portions of the instruction formatter 106 of FIG. 7 according to the present invention is shown. Flow begins at block 802.

At block 802, the XIBQ control logic 702 detects a condition in which the instruction at the end of the bottom entry of the XIBQ 104 spans into the next line of cache data of the instruction stream, the bytes of the instruction that are in bottom XIBQ 104 entry are not sufficient for the length decoders 202/ripple logic 204 to determine the instruction length (and therefore the instruction's start/end bit 232/234), and the subsequent bytes of the instruction that are required to determine its length are not yet in the next-to-bottom entry of the XIBQ 104, i.e., the next-to-bottom entry of the XIBQ 104 is invalid, or empty. Flow proceeds to block 804.

At block 804, the M-stage control logic 512 loads the line of ripple logic 204 outputs 214 generated for the bottom XIBQ 104 entry into the mux queue 502. However, the XIBQ control logic 702 does not shift out the bottom XIBQ 104 entry, because the end bit 234 still must be determined for the unknown-length instruction. That is, the bytes of the unknown-length instruction that are in the bottom XIBQ 104 entry must remain there so that the length and end bit of the instruction can be determined after the remaining bytes of the instruction arrive in the XIBQ 104. Flow proceeds to block 806.

At block 806, the line of information 214 that was loaded at block 804 reaches the bottom mux queue 502 entry. In response, the M-stage control logic 512 extracts all the instructions from the line and sends them down to the F-stage to be processed, except for the unknown-length instruction. However, the M-stage control logic 512 does not shift out the bottom mux queue 502 entry, since the end bit 234 for the unknown-length instruction is not yet known and the remaining bytes of the instruction are not yet available. The M-stage control logic 512 knows the unknown-length instruction exists because it does not have a valid end bit 234 for the instruction. That is, there is a valid start bit 232 pointing to the first byte of the instruction, but there is no valid end bit 234 pointing to a byte of the bottom mux queue 502 entry and the next-to-bottom mux queue 502 entry is invalid. Flow proceeds to block 808.

At block 808, the M-stage control logic 512 stalls the mux queue 502 until the next-to-bottom entry gets populated with valid information 214. Flow proceeds to block 812.

At block 812, the XIBQ 104 finally receives a line of cache data 132 from the instruction cache 102, which gets loaded into the next-to-bottom entry. The line of cache data 132 includes the remaining bytes of the unknown-length instruction. Flow proceeds to block 814.

At block 814, the length decoders 202/ripple logic 204 generate the instruction length 222 and start/end bits 232/234 for the instruction whose length was previously unknown. In one embodiment, the XIBQ control logic 702 uses the instruction length 222 of the previously unknown-length instruction to calculate the count of the remaining bytes of the previously unknown-length instruction that are in the next-to-bottom entry of the XIBQ 104 (i.e., that were loaded at block 812). The count of remaining bytes is subsequently used at block 818 to determine the location of the end bit 234 of the previously unknown-length instruction. Flow proceeds to block 816.

At block 816, the XIBQ control logic 702 shifts out the bottom entry. However, the M-stage control logic 512 does not load in the ripple logic 204 outputs 214 generated for the bottom XIBQ 104 entry because they are already present in the mux queue 502 according to block 804. Flow proceeds to block 818.

At block 818, the length decoders 202/ripple logic 204 process the new XIBQ 104 bottom entry (i.e., that now contains the line of cache data received at block 812), and the M-stage control logic 512 loads the outputs 214, which include the end bit 234 for the previously unknown-length instruction, into the next-to-bottom entry of the mux queue 502. Flow proceeds to block 822.

At block 822, the M-stage control logic 512 extracts from the bottom and next-to-bottom entries of the mux queue 502 the instruction whose length was previously unknown and sends it down to the F-stage to be processed. Flow proceeds to block 824.

At block 824, the M-stage control logic 512 shifts out the bottom entry of the mux queue 502. Flow ends at block 824.

As may be observed from the above, the design of the instruction formatter 106 solves the problems described above by enabling the early release of information (the instruction bytes, start/end bits, and accumulated prefix information) from the L-stage for instructions that have that information available even though an instruction at the end of the bottom XIBQ 104 entry does not.

Improved Instruction Extraction Through Prefix Accumulation

Figure 9:
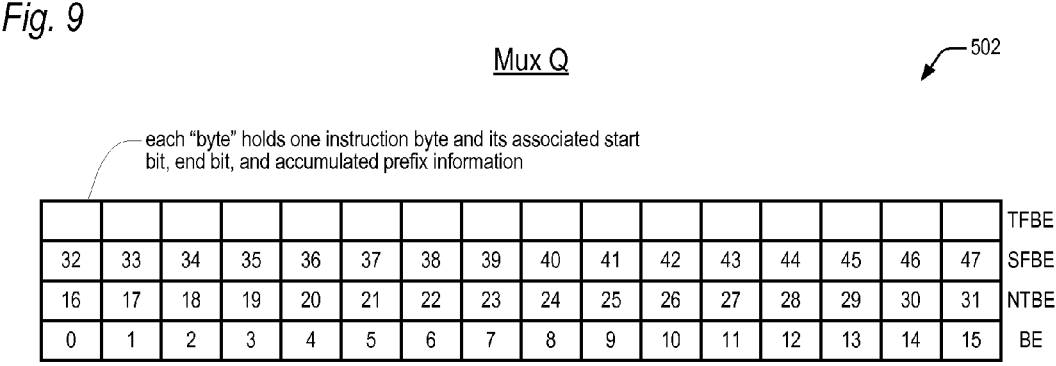
FIG. 9 is a block diagram illustrating the mux Q of FIG. 5 in more detail according to the present invention.

Referring now to FIG. 9, a block diagram illustrating the mux Q 502 of FIG. 5 in more detail according to the present invention is shown. In the embodiment of FIG. 9, the mux Q 502 includes four entries, denoted BE (bottom entry), NTBE (next-to-bottom entry), SFBE (second-from-bottom entry), and TFBE (third-from-bottom entry). Each of the sixteen "bytes," or locations, of the entries of the mux Q 502 hold one instruction byte and its associated start bit 232, end bit 234, and accumulated prefix information 238. The bytes of the BE are numbered 0 through 15, as shown. The bytes of the NTBE are numbered 16 through 31, as shown. These numbers are referred to in FIG. 10. The bytes of the SFBE are numbered 32 through 47, as shown.

Figure 10:
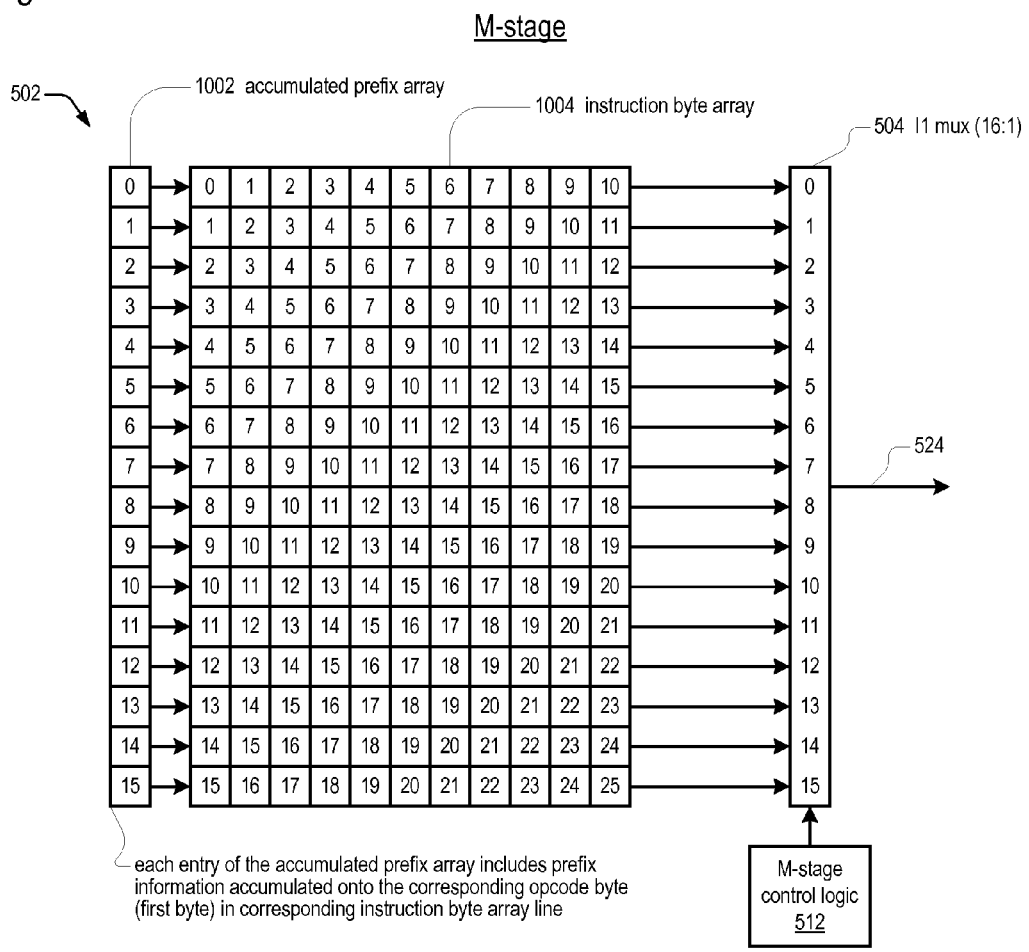
FIG. 10 is a block diagram illustrating portions of the M-stage of the instruction formatter of FIG. 1 according to the present invention.

Referring now to FIG. 10, a block diagram illustrating portions of the M-stage of the instruction formatter 106 of FIG. 1 according to the present invention is shown. The mux Q 502 is shown in FIG. 10 conceptually as a distinct accumulated prefix array 1002 and an instruction byte array 1004. The information in the accumulated prefix array 1002 and the instruction byte array 1004 is actually stored within the storage elements of the BE and NTBE entries of the mux Q 502. However, the stored information from the mux Q 502 entries is provided via wires to selection circuits (which are dynamic logic in one embodiment) that comprise the instruction muxes 504/506/508 of FIG. 5. Only I1 mux 504 is shown in FIG. 10, although each of the I2 mux 506 and the I3 mux 508 also receive the same inputs as the I1 mux 504. The instruction muxes 504/506/508 are 16:1 muxes. The I1 mux 504 inputs are numbered 0 through 15 in FIG. 10. Each I1 mux 504 input receives eleven instruction bytes and the accumulated prefix information 238 associated with the lowest order byte of the eleven bytes received at the input. The lowest order byte of the eleven bytes received at each input is the byte number of the instruction byte array 1004 that corresponds to the I1 mux 504 input number. Thus, for example, I1 mux 504 input 8 receives bytes 8 through 18 from the mux Q 502 (bytes 8 through 15 come from the BE, and bytes 16 through 18 come from the NTBE) and the accumulated prefix information 238 associated with byte 8. The reason each I1 mux 504 input receives eleven instruction bytes is that although fifteen bytes is the longest permissible x86 instruction, the largest number of non-prefix bytes permitted in an x86 instruction is eleven, and the embodiments described only extract and send down the non-prefix bytes to the remainder of the pipeline, i.e., they strip off the prefix bytes and instead represent the prefix bytes with the bits of the accumulated prefix information 238, which greatly reduces the amount of decoding required by the subsequent pipeline stages and enables the microprocessor 100 to realize the various benefits described herein.

Figure 11:
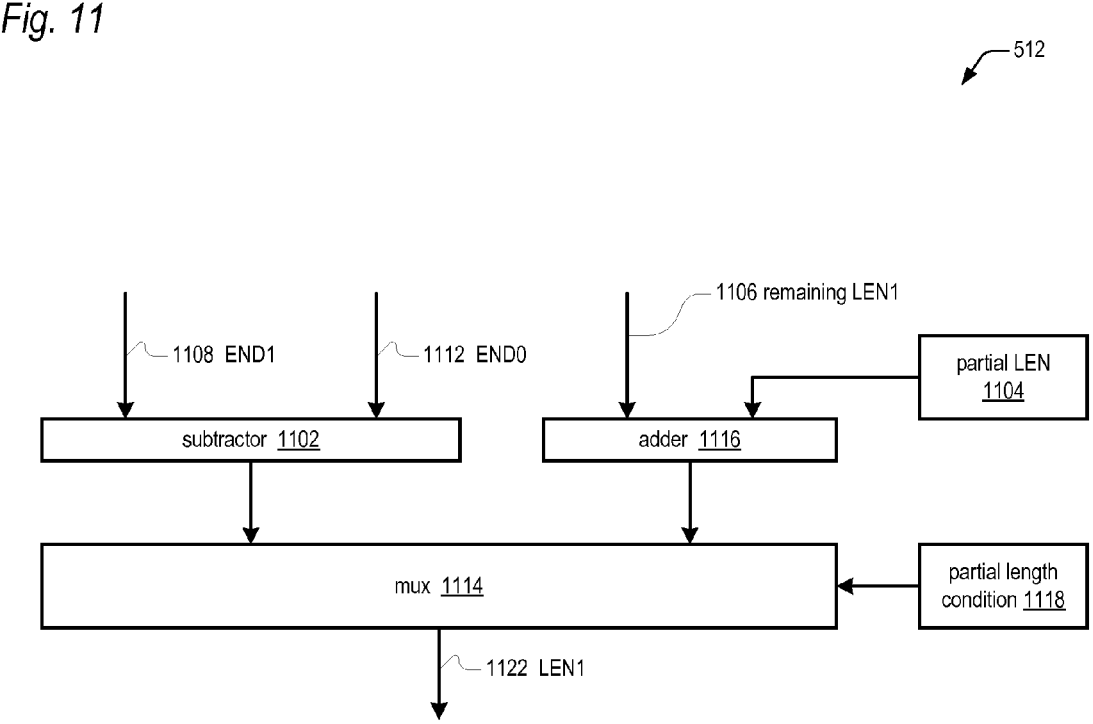
FIG. 11 is a block diagram illustrating portions of the M-stage control logic of FIG. 5 according to the present invention.

Referring now to FIG. 11, a block diagram illustrating portions of the M-stage control logic 512 of FIG. 5 according to the present invention is shown. The M-stage control logic 512 includes a 2:1 mux 1114 that generates an instruction length, denoted LEN1 1122, which is the length of an instruction of the instruction stream passing through the instruction formatter 106, namely I1 524 of FIG. 5. The LEN1 1122 is provided along with the instruction 524 as it proceeds down the pipeline and is processed. The mux 1114 selects either the output of a subtractor 1102 or the output of an adder 1116, depending upon whether in the previous cycle a partial length condition existed. The mux 1114 is controlled by an input received from a register 1118 that stores a bit indicating whether the partial length condition existed in the previous clock cycle, as described in more detail with respect to FIGS. 12-14. If the partial length condition exists, then the mux 1114 selects the adder 1116 output; otherwise, the mux 1114 selects the subtractor 1102 output. The first input of the adder 1116 is a remaining length of the instruction, denoted remaining LEN1 1106, which is described in more detail with respect to FIGS. 12-14. The M-stage control logic 512 includes other logic (not shown) that computes the remaining LEN1 1106 using the end bit position 234 of the instruction I1 524, which the mux Q 502 provides to the M-stage control logic 512. The second input of the adder 1116 is a partial length of the current instruction, denoted partial LEN 1104, which is received from a register that was loaded during the previous clock cycle, as described in more detail with respect to FIG. 12. The subtractor 1102 subtracts the byte position within the mux Q 502 of the end bit 234 of the instruction I1 524, which is denoted END1 1108 in FIG. 12, from the byte position within the mux Q 502 of the end bit 234 of the previous instruction, which is denoted END0 1112. It should be noted that although the M-stage control logic 512 conceptually performs the arithmetic described in FIG. 11, the M-stage control logic 512 may not employ traditional adder and/or subtractor circuits as show; rather, the logic that performs the arithmetic may be combinatorial logic. For example, in one embodiment the bits are operated upon in decoded form; thus, for example, a subtract operation may be performed by a Boolean AND-OR operation. It is also noted that the length of I2 526 and I3 528 are computed using respective subtractors (not shown) that function similar to the manner of subtractor 1102, but subtracting END2 from END1, and END3 from END2, respectively. Finally, the current offset within an entry of the mux Q 502 is determined by choosing the point 1 byte past the end byte of the last instruction extracted and sent down by the muxes 504/506/508.

Figure 12:
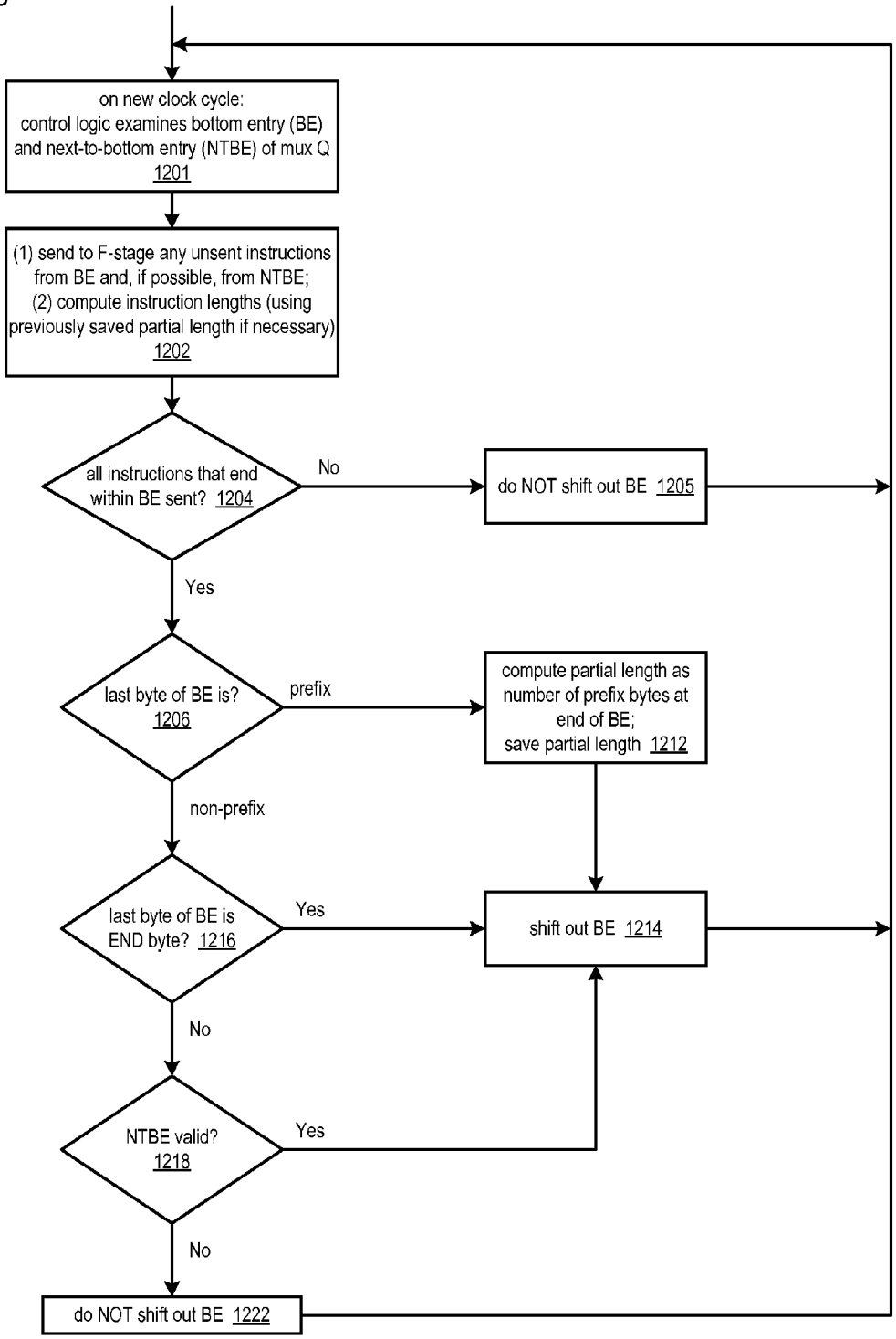
FIG. 12 is a flowchart illustrating operation of the M-stage of the instruction formatter of FIG. 1 according to the present invention.

Referring now to FIG. 12, a flowchart illustrating operation of the M-stage of the instruction formatter 106 of FIG. 1 according to the present invention is shown. Flow begins at block 1201.

At block 1201, a new clock cycle starts, and the M-stage control logic 512 examines the BE and NTBE of the mux Q 502 of FIG. 9. Flow proceeds to block 1202.

At block 1202, the M-stage control logic 512 controls the instruction muxes 504/506/508 to send to the F-stage of the instruction formatter 106 any instructions from the BE of the mux Q 502 and, if possible, from the NTBE. As mentioned above, in one embodiment the M-stage is capable of extracting three instructions per clock cycle. Because x86 instructions may vary in length from one to fifteen bytes, it is possible that anywhere from one to sixteen x86 instructions may be present in the BE of the mux Q 502. Thus, it may require multiple clock cycles to extract all of the x86 instructions from the BE of the mux Q 502. Furthermore, an instruction may span across both the BE and NTBE and depending upon whether the last byte of the BE is a prefix byte, an end byte, or other type of byte of the instruction, the M-stage control logic 512 operates differently to extract the instructions and control shifting of the BE out of the mux Q 502, as discussed in more detail below. Additionally, the M-stage control logic 512 computes the length of each of the extracted/sent instructions, and specifically the length of 11524 (LEN1 1122 of FIG. 11) using the logic of FIG. 11. In particular, if the instruction was the subject of a partial length in the previous clock cycle (as described in more detail with respect to block 1212 below), the M-stage control logic 512 computes LEN1 1122 using the stored partial LEN 1104 of FIG. 11; otherwise, the M-stage control logic 512 computes the LEN1 1122 using the subtractor 1102 of FIG. 11. Flow proceeds to block 1204.

At decision block 1204, the M-stage control logic 512 determines whether all instructions that end within the BE have been sent to the F-stage. In one embodiment, the maximum number of instructions that the M-stage is capable of extracting and sending to the F-stage per clock cycle is three.

Thus, if the M-stage extracts three instructions from the bottom entry and there is a start bit 234 associated with at least one other instruction in the bottom entry, the other instruction must wait to be extracted in the next clock cycle. If all instructions that end within the BE have been sent to the F-stage, flow proceeds to block 1206; otherwise, flow proceeds to block 1205.

At block 1205, the M-stage control logic 512 does not shift out the BE so that on the next clock cycle the M-stage control logic 512 can extract and send down more instructions of the BE. Flow returns to block 1201 to recommence the process on the next clock cycle.

At block 1206, the M-stage control logic 512 determines whether the last byte of the BE is a prefix or non-prefix byte. If the last byte of the BE is a non-prefix byte, flow proceeds to decision block 1216; if the last byte of the BE is a prefix byte, flow proceeds to block 1212.

At block 1212, the M-stage control logic 512 computes the partial length of the instruction that includes a prefix byte at the end of the BE as the number of prefix bytes at the end of the BE, which is the distance from the end byte of the previous instruction to byte 15 of the BE, which is computed within the M-stage control logic 512 by arithmetic logic (not shown). For example, in the example of FIG. 13, the partial length of instruction b is 14, as shown. It is noted that prefix byes between an end byte and a start byte are in a sort of "no-man's land," and that the prefix bytes are really redundant within the mux queue 502 since their substance has already been captured within the accumulated prefix information 238 that is stored in the mux queue 502 associated with the opcode byte of the instruction. Consequently, if the end of the BE is just prefix bytes and all the other instructions in the BE have been taken that cycle, then the M-stage control logic 512 can shift out the BE (as performed with respect to block 1214) because the prefix byte information will still be available, i.e., will have been accumulated onto the opcode byte (which may be in a forthcoming 16-byte line) and because the M-stage control logic 512 saves the number of prefix bytes (into the partial LEN register 1104 of FIG. 11) that will be shifted out of the mux Q 502. On the other hand, if there is a non-prefix byte at the end of the bottom entry that has not been extracted/sent/taken that cycle, then the M-stage control logic 512 cannot shift out the BE (as shown with respect to block 1222). Flow proceeds to block 1214.

At block 1214, the M-stage control logic 512 controls the mux queue 502 to shift out the BE. Flow returns to block 1201 to recommence the process on the next clock cycle.

At decision block 1216, the M-stage control logic 512 determines whether the last byte of the BE is an end byte of an instruction, i.e., whether the end bit 234 is true. If so, flow proceeds to block 1214; otherwise, flow proceeds to decision block 1218.

At decision block 1218, the M-stage control logic 512 determines whether the NTBE is valid. It is noted that when the end byte of the last instruction that is taken is at the last byte (i.e., byte 15) of the BE, or if the end byte is past the last byte (i.e., in the NTBE) and the NTBE is valid, then the M-stage control logic 512 shifts out the BE; otherwise, the M-stage control logic 512 keeps the BE until the next clock cycle. If the NTBE is valid, flow proceeds to block 1214; otherwise, flow proceeds to block 1222.

At block 1222, the M-stage control logic 512 does not shift out the BE. This is because the actual instruction bytes (i.e., non-prefix bytes) of the instruction span the BE and NTBE, the latter of which is not valid, in which case the M-stage control logic 512 may not be capable of determining the length of the instruction, since the end bit 234 of the instruction is not known because the NTBE, which would include the end bit 234, is not yet valid. Flow returns to block 1201 to recommence the process on the next clock cycle to wait for the NTBE to become filled with valid data.

Figure 13:
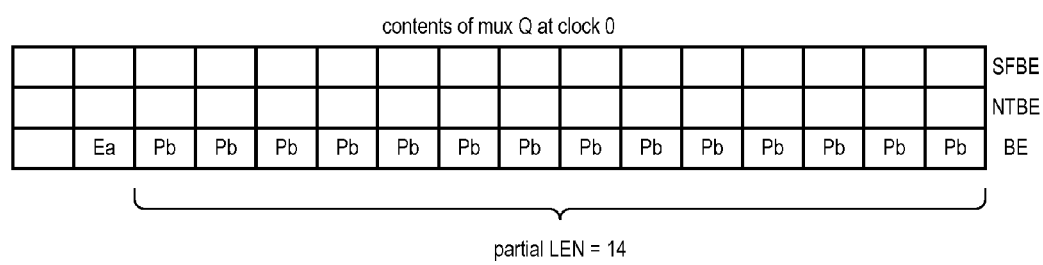
FIG. 13 is two block diagrams of the contents of the mux queue of FIG. 5 during successive clock cycles to illustrate the operation of the M-stage by way of example according to the present invention.
Figure 13:
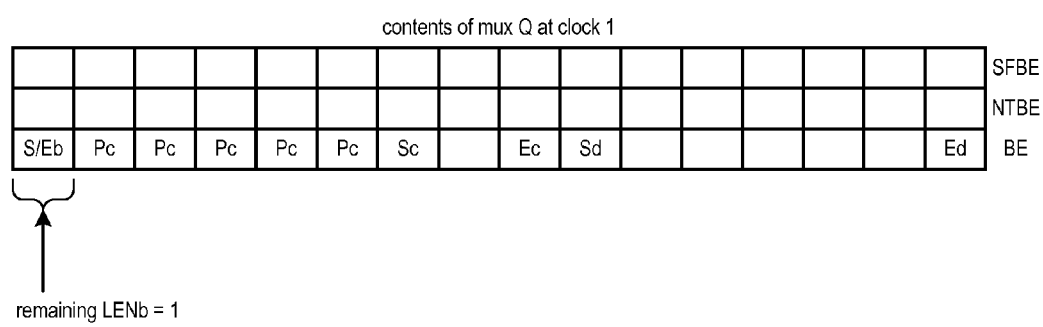

Referring now to FIG. 13, two block diagrams of the contents of the mux queue 502 of FIG. 5 during successive clock cycles to illustrate the operation of the M-stage by way of example according to the present invention are shown. The first contents of the mux queue 502 are during a first clock cycle, denoted clock 0, and second contents of the mux queue 502 are during a second clock cycle, denoted clock 1. Only the contents of the three bottom entries are shown. In FIG. 13, "S" denotes a start byte (i.e., start bit 232 is true), "E" denotes an end byte (i.e., end bit 234 is true), and "P" denotes a prefix byte (i.e., the accumulated prefix information 238 indicates such). There are four instructions, which are referred to as a, b, c, d, whose start, end, and prefix bytes are shown, and the various values are denoted by one of these four letters to signify the particular one of the four instructions. The byte numbers referred to herein are with respect to FIG. 9, e.g., bytes 0 through 47 that occupy the locations within the BE, NTBE, and SFBE of the mux Q 502.

At the beginning of cycle 0, the BE contains the end byte of instruction a (Ea) in byte 1 and contains 14 prefix bytes of instruction b (Pb) in bytes 2 through 15. Also, because instruction b begins in the BE but its start byte is in the NTBE rather than the BE, the partial LEN 1104 is calculated as 14. The NTBE and SFBE contents are invalid, i.e., the XIBQ 104 and length decoders 202/ripple logic 204 have not provided another entry worth of instruction cache 102 data of the instruction stream beyond the BE nor their associated information (i.e., start bit 232, end bit 234, and accumulated prefix information 238).

During cycle 0, the M-stage control logic 512 examines the contents of the BE and NTBE (block 1201 of FIG. 12) and sends instruction a to the F-stage (block 1202). Additionally, the M-stage control logic 512 computes the length of instruction a as the difference between the end byte position of instruction a and the end byte position of the previous instruction. Finally, because all instructions that end within the BE (instruction a) have been sent (decision block 1204) and the last byte (byte 15) of the BE is a prefix byte (decision block 1206), the M-stage control logic 512 computes the partial length of instruction b, which is 14 bytes, and saves it in the partial LEN register 1104 (block 1212). Finally, the M-stage control logic 512 shifts the BE out of the mux Q 502 (block 1214).

At the beginning of clock cycle 1, as a consequence of the shift out at block 1214 during clock 0 and the shift in of another 16-byte line of outputs 214 of the ripple logic 204, the BE contains the following: both the start byte of instruction b (Sb) and the end byte of instruction b (Eb) in byte 0 (i.e., the non-prefix portion of instruction b is only a single byte); 5 prefix bytes of instruction c (Pc) in bytes 1 through 5; the start byte of instruction c (Sc) in byte 6; the end byte of instruction c (Ec) in byte 8; the start byte of instruction d (Sd) in byte 9; and the end byte of instruction d (Ed) in byte 15.

During cycle 1, the M-stage control logic 512 examines the contents of the BE and NTBE (block 1201) and sends instructions b, c, and d to the F-stage (block 1202). Additionally, the M-stage control logic 512 computes: the length of instruction b (LEN1 1122) (block 1202) (15 bytes in this example) as the sum of the partial LEN 1104 (14 bytes in this example) plus the remaining length of instruction b (1 byte in this example); the length of instruction c (8 bytes in this example) as the difference between the end byte position of instruction c and the end byte position of instruction b; and the length of instruction d (7 bytes in this example) as the difference between the end byte position of instruction d and the end byte position of instruction c. Furthermore, because all instructions that end within the BE (instructions b, c, d) have been sent (decision block 1204) and the last byte (byte 15) of the BE is a non-prefix byte (decision block 1206) and the last byte of the BE is an end byte (decision block 1216), the M-stage control logic 512 shifts the BE out of the mux Q 502 (block 1214).

As may be observed from the example of FIG. 13, by accumulating the accumulated prefix information 238 of instruction b onto its opcode byte and saving the partial LEN 1104 of instruction b, advantageously, the instruction formatter 106 is able to shift out the BE containing the prefix bytes of instruction b at its end and on the next clock cycle extract and send down for processing up to three instructions received into the mux Q 502. Without the accumulation of the accumulated prefix information 238 and the saving of the partial LEN 1104, this would not be possible (namely, instructions c and d would not be extracted and sent during the same clock cycle as instruction b, but would instead have to be extracted and sent in a subsequent clock cycle), thereby potentially reducing utilization of the microprocessor 100 resources by starving the functional units of the microprocessor from having enough instructions to process.

Figure 14:
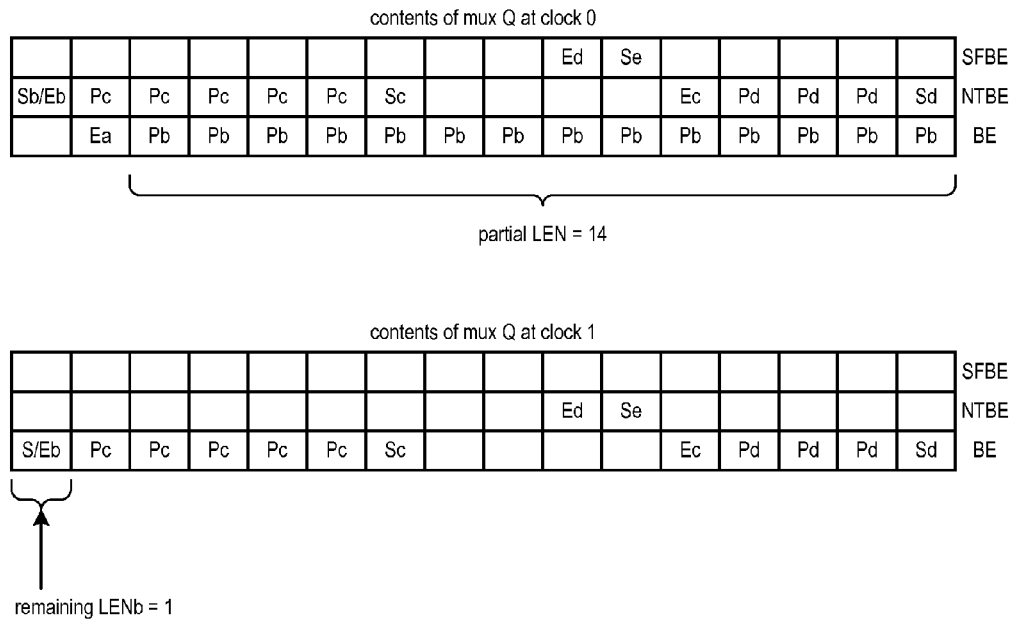
FIG. 14 is two block diagrams of the contents of the mux queue of FIG. 5 during successive clock cycles to illustrate the operation of the M-stage by way of example according to the present invention.

Referring now to FIG. 14, two block diagrams of the contents of the mux queue 502 of FIG. 5 during successive clock cycles to illustrate the operation of the M-stage by way of example according to the present invention are shown. The example of FIG. 14 is similar to the example of FIG. 13 in many respects; however, the location of the instructions and timing of their entry into and exit from the mux Q 502 are different as described here.

At the beginning of cycle 0, the BE contains the end byte of instruction a (Ea) in byte 1 and contains 14 prefix bytes of instruction b (Pb) in bytes 2 through 15. Also, because instruction b begins in the BE but its start byte is in the NTBE rather than the BE, the partial LEN 1104 is computed as 14. The NTBE contains both the start byte of instruction b (Sb) and the end byte of instruction b (Eb) in byte 16 (i.e., instruction b is only a single byte long, excluding prefix bytes); 5 prefix bytes of instruction c (Pc) in bytes 17 through 21; the start byte of instruction c (Sc) in byte 22; the end byte of instruction c (Ec) in byte 27; 3 prefix bytes of instruction d (Pd) in bytes 28 through 30; and the start byte of instruction d (Sd) in byte 31. The SFBE contains the end byte of instruction d (Ed) in byte 41 and the start byte of instruction e (Se) in byte 42.

During cycle 0, the M-stage control logic 512 examines the contents of the BE and NTBE (block 1201 of FIG. 12) and sends instruction a to the F-stage (block 1202). Additionally, the M-stage control logic 512 computes the length of instruction a as the difference between the end byte position of instruction a and the end byte position of the previous instruction. Finally, because all instructions that end within the BE (instruction a) have been sent (decision block 1204) and the last byte (byte 15) of the BE is a prefix byte (decision block 1206), the M-stage control logic 512 computes the partial length of instruction b, which is 14 bytes, and saves it in the partial LEN register 1104 (block 1212). Finally, the M-stage control logic 512 shifts the BE out of the mux Q 502 (block 1214).

At the beginning of clock cycle 1, as a consequence of the shift out at block 1214 during clock 0, the BE contains the previous contents of the NTBE during clock 0, and the NTBE contains the previous contents of the SFBE during clock 0.

During cycle 1, the M-stage control logic 512 examines the contents of the BE and NTBE (block 1201) and sends instructions b, c, and d to the F-stage (block 1202). Additionally, the M-stage control logic 512 computes: the length of instruction b (LEN1 1122) (block 1202) (15 bytes in this example) as the sum of the partial LEN 1104 (14 bytes in this example) plus the remaining length of instruction b (1 byte in this example); the length of instruction c (11 bytes in this example) as the difference between the end byte position of instruction c and the end byte position of instruction b; and the length of instruction d (14 bytes in this example) as the difference between the end byte position of instruction d and the end byte position of instruction c. Furthermore, because all instructions that end within the BE (instructions b, c, d) have been sent (decision block 1204) and the last byte (byte 15) of the BE is a non-prefix byte (decision block 1206) and the last byte of the BE is not an end byte (decision block 1216) and the NTBE is valid (decision block 1218), the M-stage control logic 512 shifts the BE out of the mux Q 502 (block 1214).

Figure 15:
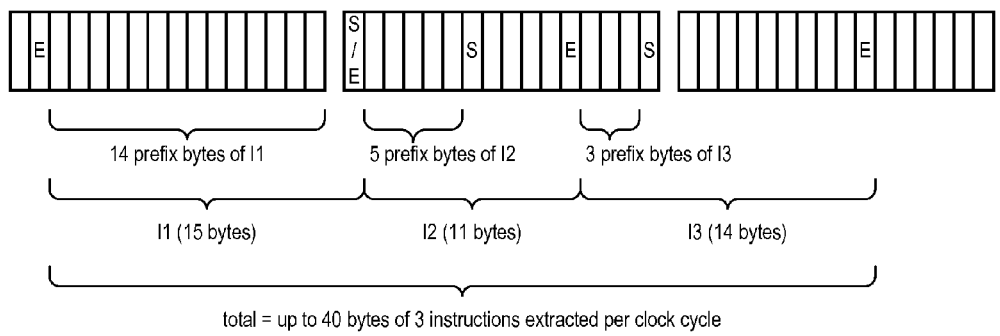
FIG. 15 is a block diagram illustrating with respect to the example of FIG. 14 how, in one clock cycle, the instruction formatter is capable of extracting and sending down for further processing three instructions which comprise up to 40 instruction bytes.

As may be observed from the example of FIG. 14, in one clock cycle, the instruction formatter 106 is advantageously capable of extracting and sending down for further processing three instructions which comprise up to 40 instruction bytes, as shown in FIG. 15.

Bad Branch Prediction Detection, Marking, and Accumulation for Fast Instruction Stream Processing Referring again to FIG. 1, when the fetch unit 126 outputs the fetch address 142 to fetch a line of instruction bytes from the instruction cache 102 for provision to the XIBQ 104, the BTAC 128 also looks up the fetch address 142. If the fetch address 142 hits in the BTAC 128 this indicates that previously there was a branch instruction in the cache line at the fetch address that was executed; consequently, the BTAC 128 makes a prediction of whether the branch instruction will be taken and, if so, the BTAC 128 makes a prediction of the branch target address 146. In particular, the BTAC 128 makes the prediction before the microprocessor 100 ever extracts or decodes the purported branch instruction from the stream of instruction bytes. Consequently, it may be the case that the BTAC 128 is making a prediction for a branch instruction that is not even present in the fetched cache line of instruction bytes, i.e., the BTAC 128 made a bad prediction that caused the microprocessor 100 to branch erroneously. It should be kept in mind that a "bad prediction" here is not the same as an incorrect prediction. All branch predictors by their nature run the possibility of predicting incorrectly because of the dynamic nature of programs, such as the changing values of conditions codes or data upon which conditional branch instructions conditionally branch. However, here a bad prediction indicates that either the cache line for which the BTAC 128 is predicting is not the same cache line, or it is the same cache line but the contents of the cache line has been changed. Reasons this condition can occur, most of which are discussed in U.S. Pat. No. 7,134,005 (CNTR.2022), include: tag aliasing due to fact that the BTAC 128 only stores a partial address tag rather than a full address tag; virtual aliasing due to fact that BTAC 128 stores virtual address tags rather than physical address tags; self-modifying code. When such a condition occurs, the microprocessor 100 must insure that it does not send down for processing the badly predicted instruction and any subsequently fetched instructions erroneously fetched due to the bad prediction.

Figure 16:
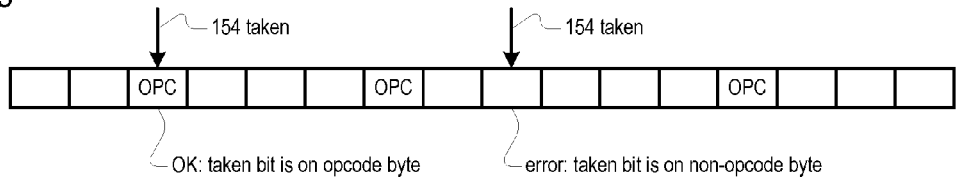
FIG. 16 is a block diagram illustrating an indication of a situation in which the BTAC of FIG. 1 has made a bad prediction that caused the microprocessor to branch erroneously, namely the taken bit of FIG. 1 is true for an instruction byte that is not the opcode byte of an instruction.

One indication that the BTAC 128 has made a bad prediction that caused the microprocessor 100 to branch erroneously is if the taken bit 154 (described above with respect to FIG. 1) is true for an instruction byte that turns out not to be the first byte of an instruction, as shown in FIG. 16. As discussed above, a true value of a taken bit 154 provided by the BTAC 128 indicates that the BTAC 128 thinks the instruction byte is the first byte of a branch instruction (i.e., the opcode byte) and that the fetch unit 126 branched to the target address 146 predicted by the BTAC 128.

One way to make the bad BTAC prediction determination is to wait until the distinct instructions are extracted from the stream of instruction bytes and their lengths are known and then scan every non-first byte of each instruction to see whether its taken bit 154 is true. However, this is a very slow way to perform the check because it requires a great deal of masking and shifting and ORing together the result of each byte, which creates a timing problem.

To avoid the timing problem, the embodiments described herein accumulate the information provided by the taken bit 154 as part of the process performed by the ripple logic 204 and then make use of the accumulated information when they extract the instructions in the M-stage. In particular, the ripple logic 204 detects the condition and ripples the indicator through to the end byte of the instruction, which enables a single byte to be checked, namely the end byte of the instruction, as the instructions are being extracted in the M-stage to determine whether an instruction is a bad instruction or not, i.e., whether the instruction should be included in the instruction stream sent down the pipeline for processing.

Figure 17:
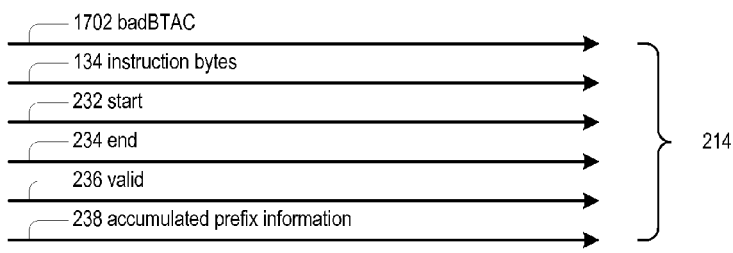
FIG. 17 is an illustration of the signals that make up the outputs of the ripple logic according to the present invention.

Referring now to FIG. 17, an illustration of the signals that make up the outputs 214 of the ripple logic 204 according to the present invention is shown. The ripple logic 204 output signals 214 of FIG. 17 are similar to those shown in FIG. 2, with the addition of a badBTAC signal 1702 associated with each instruction byte, whose use will be described in more detail below. Additionally, the ripple logic 204 outputs include: a signal that indicates, if true, that the corresponding instruction byte is the first byte of a branch instruction as predicted by the BTAC 128 but that the BTAC 128 predicted the branch instruction will not be taken (not shown); and a signal that indicates the byte previous to this byte was the end byte of an instruction (not shown).

Figure 18:
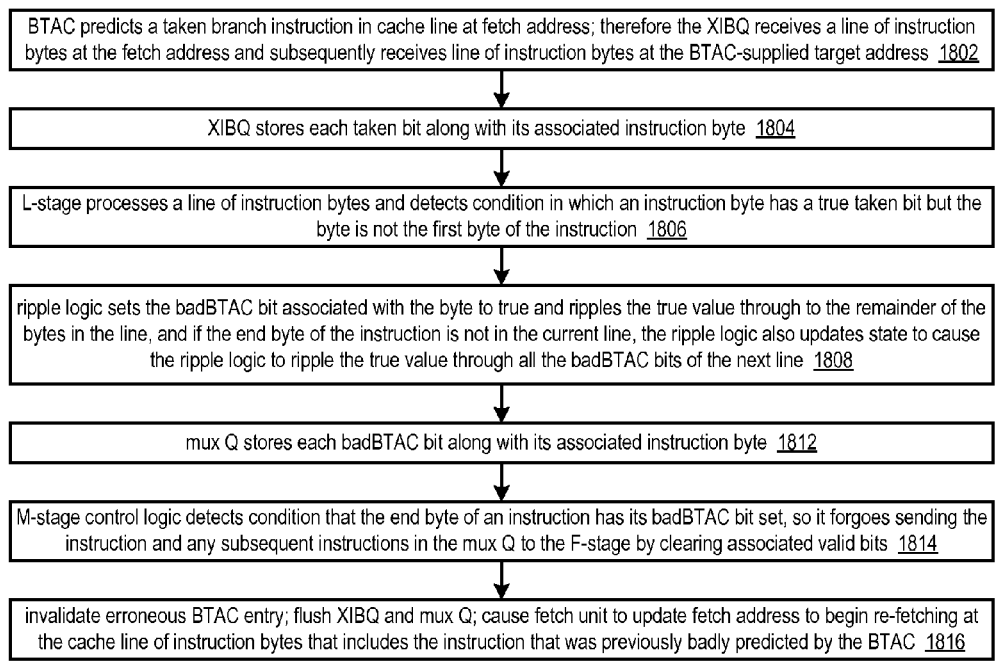
FIG. 18 is a flowchart illustrating operation of the microprocessor of FIG. 1 according to the present invention.

Referring now to FIG. 18, a flowchart illustrating operation of the microprocessor 100 of FIG. 1 according to the present invention is shown. Flow begins at block 1802.

At block 1802, the BTAC 128 predicts that a branch instruction exists within a cache line specified by the fetch address 142 supplied by the fetch unit 126 and that the branch instruction will be taken. The BTAC 128 also supplies a prediction of the target address 146 of the branch instruction. Consequently, the XIBQ 104 receives a first line of 16 instruction bytes from the instruction cache 102 at the fetch address 142 and subsequently receives a second line of 16 instruction bytes from the instruction cache 102 at the predicted target address 146. Flow proceeds to block 1804.

At block 1804, the XIBQ 104 stores each taken bit 154 (described above with respect to FIG. 1) along with its associated instruction byte of the two lines of instruction bytes received at block 1802. Flow proceeds to block 1806.

At block 1806, the length decoders 202 and ripple logic 204 process the first line of instruction bytes and detect a condition in which an instruction byte has a true taken bit 154, but the byte is not the first byte of the instruction, as shown in the error situation of FIG. 16. That is, the ripple logic 204 knows which bytes of the 16-byte line of instruction bytes is the first byte of each of the instructions, which is what enables it to set the end bits 234. Armed with this knowledge, the ripple logic block 204 associated with each first non-byte of an instruction checks the taken bit 154 for a true value and detects the condition. Flow proceeds to block 1808.

At block 1808, in response to detecting the condition in which a taken bit 154 is true on a non-first byte of an instruction, the ripple logic 204 sets the badBTAC bit 1702 to true of the offending instruction byte. Additionally, the ripple logic 204 ripples the true badBTAC bit 1702 value from its byte location through to the remainder of the bytes in the 16-byte line including the offending byte. Still further, if the end byte of the instruction is not present in the first line of instruction bytes, the ripple logic 204 updates state (e.g., a flip-flop) (not shown) that indicates a bad BTAC 128 prediction was made for an instruction in the current line. Then, when the ripple logic 204 processes the second line of instruction bytes, because the state is true, the ripple logic 204 sets the badBTAC bit 1702 for all the bytes of the second line of instruction bytes. Flow proceeds to block 1812.

At block 1812, the mux Q 502 stores the ripple logic 204 outputs 214, including the badBTAC bits 1702, for the first and second lines of instruction bytes along with their respective instruction bytes. Flow proceeds to block 1814.

At block 1814, the M-stage control logic 512 sees that there is a true badBTAC bit 1702 associated with an instruction byte for which the end bit 234 is also true (i.e., detects the bad BTAC 128 prediction condition). In response, the M-stage control logic 512 forgoes sending to the F-stage the offending instruction and any subsequent instructions in the line by clearing their associated valid bits 534/536/538. However, it is noted that if an instruction precedes the offending instruction within the line, this instruction is valid and is sent down to the F-stage. Advantageously, as noted above, the rippling of the true badBTAC bit 1702 through to the end byte of the offending instruction enables the M-stage control logic 512 to check only a single byte, i.e., the byte indicated by the true end bit 234, which significantly eases the timing constraints. Flow proceeds to block 1816.

At block 1816, the microprocessor 100 invalidates the erroneous entry in the BTAC 128. Additionally, the microprocessor 100 flushes the XIBQ 104 and the mux Q 502 of all their contents and causes the fetch unit 126 to update the fetch address 142 to begin re-fetching at the line of instruction bytes for which the BTAC 128 generated the bad prediction. On the re-fetch, the BTAC 128 should not generate a bad prediction since the bad entry has now been cleared out, i.e., on the re-fetch the BTAC will predict "not taken." In one embodiment, the steps of block 1816 are performed in the F-stage of the instruction formatter 106 and/or the instruction translator 112 stage. Flow ends at block 1816.

Efficient Determination of x86 Instruction Lengths

Determining the length of an x86 instruction can be very complex. This is described in detail in chapter 2 of the Intel IA-32 Architecture Software Developer's Manual, Volume 2A: Instruction Set Reference, A-M. As shown, the total instruction length is the sum of the number of prefix bytes (if any), the number of opcode bytes (1, 2, or 3), the presence or absence of a ModR/M byte, the presence or absence of a SIB byte, the length of the Address Displacement (if any), and the length of the Immediate data (if any). The following are some characteristics, or requirements, of x86 instructions that affect the determination of their length, excluding prefixes:

The number of opcode bytes is:
  3 if the first two bytes are 0F 38/3A
  2 if first byte is 0F and the second byte is not 38/3A
  1 otherwise
The presence/absence of a ModR/M byte is determined by looking at the opcode byte(s), as follows:
  if three-byte opcode, then the ModR/M is mandatory
  if one-byte or two-byte opcode, then look at opcode byte(s)

The presence/absence of a SIB byte is determined by looking at the ModR/M byte.
The presence/absence of a Displacement is determined by looking at the ModR/M byte.
The size of the Displacement is determined by looking at the ModR/M byte and the current address size (AS).
The presence/absence of Immediate data is determined by looking at the opcode byte(s).
The size of the Immediate data is determined by looking at the opcode byte(s), the current operand size (OS), the current AS, and the REX.W prefix; specifically, the ModR/M byte does not affect the Immediate data size.
If there is no ModR/M byte, then there is no SIB, Displacement, or Immediate data.

Figure 19:
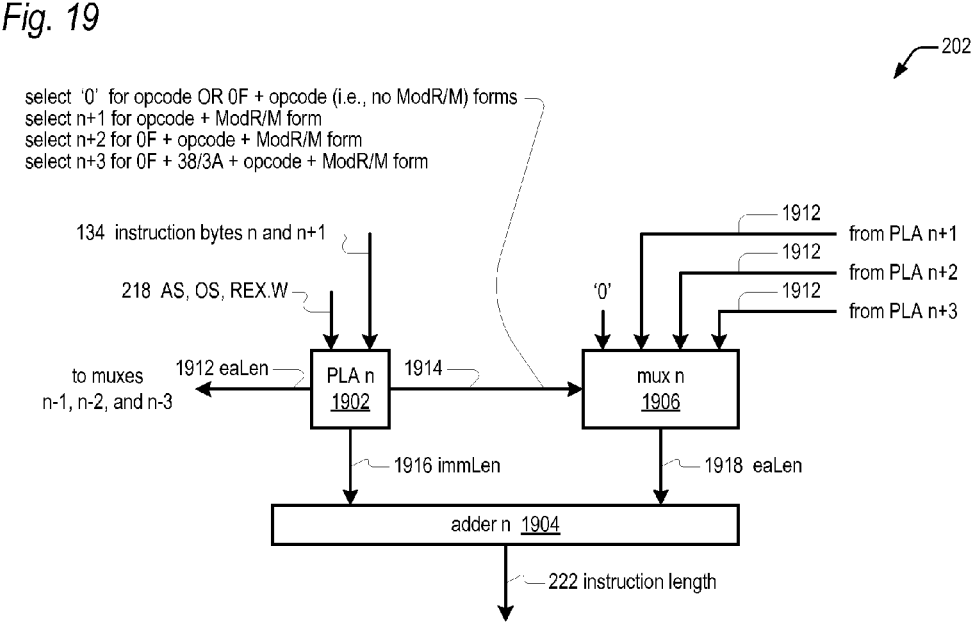
FIG. 19 is a block diagram illustrating in detail one of the length decoders of FIG. 2 according to the present invention.

There are effectively only five forms of instruction opcode and ModR/M bytes when it comes to determining instruction length:
  opcode
  0F+opcode
  opcode+ModR/M
  0F+opcode+ModR/M
  0F+38/3A+opcode+ModR/M Referring now to FIG. 19, a block diagram illustrating in detail one of the length decoders 202 of FIG. 2 according to the present invention is shown. As shown in FIG. 2, preferably there are 16 length decoders 202. FIG. 19 shows a representative length decoder 202, referred enumerated as n. As shown in FIG. 2, each length decoder 202 is associated with an instruction byte 134. That is, length decoder 0 is associated with instruction byte 0, length decoder 1 is associated with instruction byte 1, and so forth up to length decoder 15 is associated with instruction byte 15. The length decoder 202 comprises a PLA 1902, a 4:1 mux 1906, and an adder 1904.

The PLA 1902 receives the AS, OS, and REX.W values 218 of FIG. 2. The AS specifies the address size, the OS specifies the operand size, and the REX.W value indicates the presence of a REX.W prefix. The PLA 1902 also receives its associated instruction byte 134, denoted instruction byte n, and the next higher rank instruction byte 134, denoted n+1. Thus, for example, PLA 3 1902 receives instruction bytes 3 and 4.

The PLA 1902 generates an immLen 1916 value, which is provided to a first input of the adder 1904. The immLen 1916 is a value between 1 and 9 inclusive, and is the sum of the number of opcode bytes, and the size of the Immediate data (0, 1, 2, 4, 8). The PLA 1902 determines the immLen 1916 by assuming that the two instruction bytes 134 are the first two opcode bytes of the instruction, and generates the immLen 1916 based on the two opcode bytes (or one opcode byte if not 0F) and the OS, AS, and REX.W 218 values.

The PLA 1902 generates an eaLen 1912 value, which is provided to the mux 1906 of each of the three lower rank length decoders 202. The eaLen 1912 is a value between 1 and 6 inclusive, and is the sum of the number of ModR/M bytes (1-PLA always assumes presence of a ModR/M byte), the number of SIB bytes (0 or 1), and the size of the Displacement (0, 1, 2, 4). The PLA 1902 determines the eaLen 1912 by assuming that the first instruction byte 134 is the ModR/M byte of the instruction, and generates the eaLen 1912 based on the ModR/M byte value and the AS 218 value.

The mux 1906 receives on one input a zero value. The mux 1906 receives its other three inputs the eaLen 1912 from each of the three higher rank PLA 1902. The mux 1906 selects one of its inputs for providing on its eaLen output 1918, which is provided to a second input of the adder 1904. In one embodiment, in order to reduce propagation delay, rather than having a mux 1906, the various eaLen 1912 inputs to the adder 1904 are tri-state wired-OR signals.

The adder 1904 adds the immLen 1916 and the selected eaLen 1918 to generate the final instruction length 222 of FIG. 2.

The PLA 1902 generates a control signal 1914 to control the mux 1906 based on which of the five forms mentioned above that it detects as follows:
1. select zero input for instruction forms that do not have a ModR/M byte, namely:
    opcode only, or
    0F+opcode
2. select PLA n+1 for instruction form:
    opcode+ModR/M
3. select PLA n+2 for instruction form:
    0F+opcode+ModR/M
4. select PLA n+3 for instruction form:
    0F+38/3A+opcode+ModR/M The arrangement of the sixteen length decoders 202 is shown in detail in FIG. 20. Preferably, PLA 15 receives instruction byte 15 and instruction byte 0 from the previous line, and mux 15 receives the eaLen 1912 three additional PLA 1902 not shown that examine instruction bytes 0/1, 1/2, and 2/3 of the previous line.

An advantage of examining two bytes at a time by each PLA 1902 as described above significantly reduces the number of minterms required, which allows us to reduce the size of the logic on the die. The design provides a desirable balance between the reduction of the total number of minterms and incurring an acceptable amount of delay in order to meet timing requirements.

Figure 20:
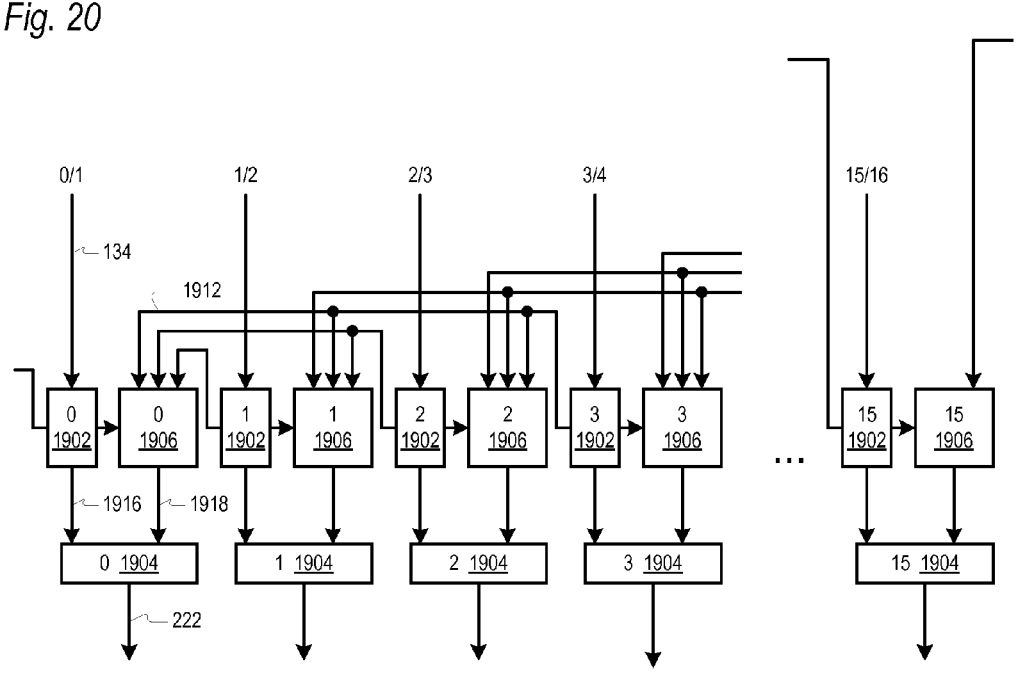
FIG. 20 is a block diagram illustrating in detail the arrangement of the sixteen length decoders of FIG. 19 according to the present invention.
Figure 21:
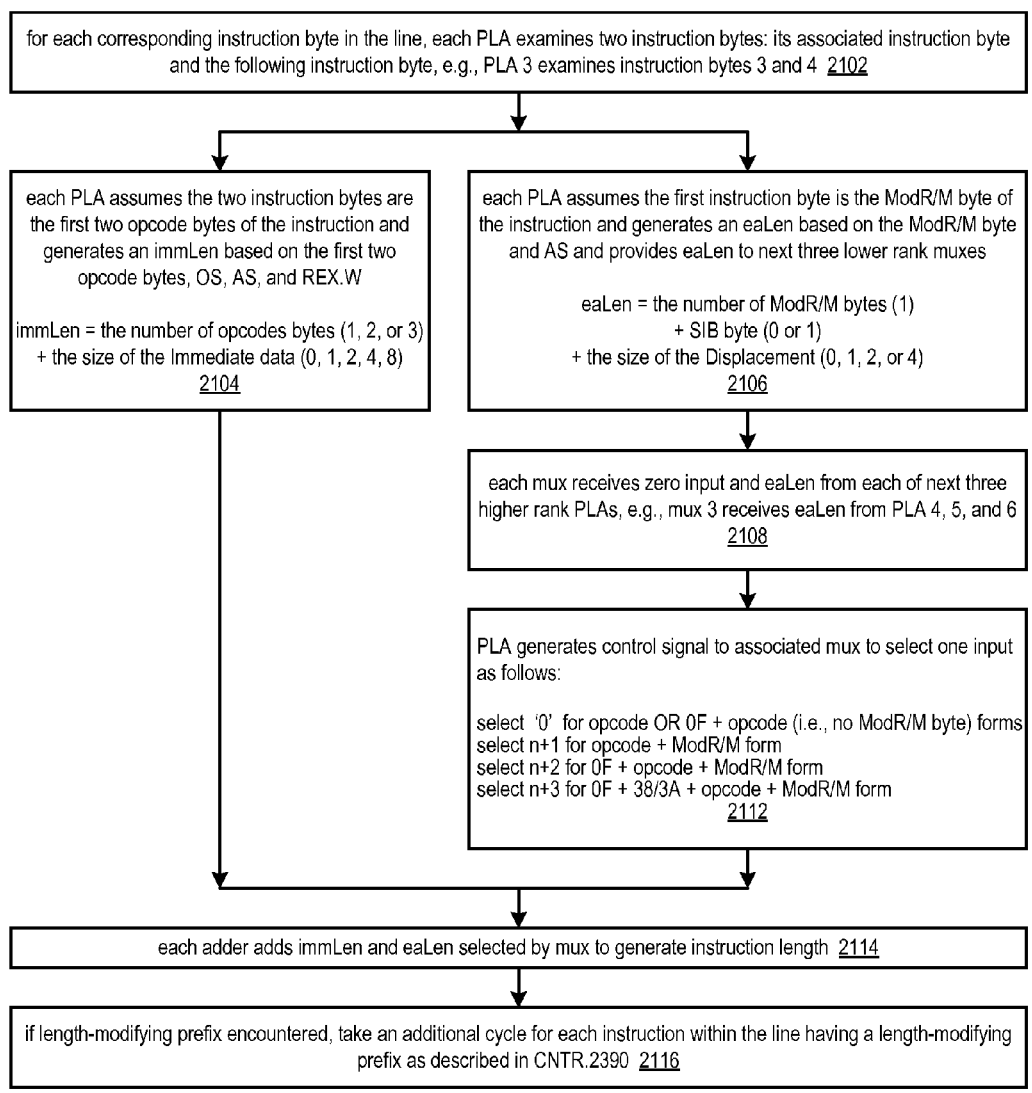
FIG. 21 is a flowchart illustrating operation of the length decoders of FIG. 20 according to the present invention.

FIG. 21 is a flowchart illustrating operation of the length decoders 202 of FIG. 20 according to the present invention as described above. Flow begins at block 2102.

At block 2102, for each instruction byte 134 in the line of instruction bytes 134 received from the XIBQ 104, the corresponding PLA 1902 examines two instruction bytes 134, namely, the corresponding instruction byte 134 and the following instruction byte 134. For example, PLA 3 1902 examines instruction bytes 3 and 4. Flow proceeds concurrently to blocks 2104 and 2106.

At block 2104, each PLA 1902 assumes the two instruction bytes 134 are the first two opcode bytes of the instruction and generates an immLen 1916 based on the first two opcode bytes and the OS, AS, and REX.W prefix values, if any. Specifically, the immLen 1916 is equal to the sum of the number of opcode bytes (which is 1, 2, or 3) plus the size of the Immediate data (which is 0, 1, 2, 4, or 8). Flow proceeds to block 2114.

At block 2106, each PLA 1902 assumes the first instruction byte 134 is the ModR/M byte of the instruction and generates an eaLen 1918 based on the ModR/M byte and the AS and provides the eaLen 1918 to the next three lower rank muxes 1906. Specifically, the eaLen 1918 is equal to the sum of the number of ModR/M bytes (which is 1) plus the SIB byte (0 or 1) plus the size of the Displacement (which is 0, 1, 2, or 4). Flow proceeds to block 2108.

At block 2108, each mux 1906 receives a zero input and the eaLen 1918 from each of the next three higher rank PLA 1902. For example, PLA 3 1902 receives the eaLen 1918 from PLA 4, 5, and 6 1902. Flow proceeds to block 2112.

At block 2112, each PLA 1902 generates a control signal to the associated mux 1906 to select one inputs based on which of the five forms mentioned it detects as described above. Flow proceeds to block 2114.

At block 2114, each adder 1904 adds the immLen 1916 to the eaLen 1918 selected by the mux 1906 to generate the instruction length 222. Flow proceeds to block 2116.

At block 2116, if a length-modifying prefix is encountered, the L-stage takes an additional clock cycle for each instruction within the line of instruction bytes having a length-modifying prefix as described with respect to the above Figures, and particularly FIGS. 1-4.

While various embodiments of the present invention have been described herein, it should be understood that they have been presented by way of example, and not limitation. It will be apparent to persons skilled in the relevant computer arts that various changes in form and detail can be made therein without departing from the scope of the invention. For example, software can enable, for example, the function, fabrication, modeling, simulation, description and/or testing of the apparatus and methods described herein. This can be accomplished through the use of general programming languages (e.g., C, C++), hardware description languages (HDL) including Verilog HDL, VHDL, and so on, or other available programs. Such software can be disposed in any known computer usable medium such as semiconductor, magnetic disk, or optical disc (e.g., CD-ROM, DVD-ROM, etc.). Embodiments of the apparatus and method described herein may be included in a semiconductor intellectual property core, such as a microprocessor core (e.g., embodied in HDL) and transformed to hardware in the production of integrated circuits. Additionally, the apparatus and methods described herein may be embodied as a combination of hardware and software. Thus, the present invention should not be limited by any of the exemplary embodiments described herein, but should be defined only in accordance with the following claims and their equivalents. Specifically, the present invention may be implemented within a microprocessor device which may be used in a general purpose computer. Finally, those skilled in the art should appreciate that they can readily use the disclosed conception and specific embodiments as a basis for designing or modifying other structures for carrying out the same purposes of the present invention without departing from the scope of the invention as defined by the appended claims.

We claim:

1. An apparatus in a microprocessor that has an instruction set architecture in which instructions may include a length-modifying prefix used to select an address/operand size other than a default address/operand size, the apparatus configured to mark the start byte and the end byte of each instruction in a stream of instruction bytes, the apparatus comprising:
   hardware decode logic, configured to decode each instruction byte of a predetermined number of instruction bytes of the stream and determine whether each instruction byte specifies a length-modifying prefix, the start of an instruction, or the end of an instruction, the decode logic generating instruction start and end marks based on an address/operand size; and
   hardware operand/address size logic, coupled to the decode logic, configured to provide the default operand/address size to the decode logic to use to generate the start and end marks during a first clock cycle during which the decode logic decodes the predetermined number of instruction bytes, wherein if during the first clock cycle and any of N subsequent clock cycles the decode logic indicates that one of the predetermined number of instruction bytes of the stream specifies a length-modifying prefix, the operand/address size logic is further configured to provide to the decode logic on the next clock cycle the address/operand size specified by the length-modifying prefix to use to generate the start and end marks;

wherein N is the number of instructions of the predetermined number of instruction bytes of the stream having at least one length-modifying prefix, wherein N is zero if none of the instructions of the predetermined number of instruction bytes of the stream have at least one length-modifying prefix; and wherein the apparatus is configured to generate the correct start and end mark for each of the instruction bytes in N+1 clock cycles, regardless of the number of prefix bytes included in any of the instructions of the predetermined number of instruction bytes of the stream.

2. The method of claim 1, wherein the apparatus is further configured to cause the predetermined number of instruction bytes of the stream to be shifted out of an instruction queue:

relative to the first clock cycle, if the decode logic indicates that none of the predetermined number of instruction bytes of the stream specifies a length-modifying prefix; and relative to the Nth clock cycle subsequent to the first clock cycle, if the decode logic indicates that one or more of the predetermined number of instruction bytes of the stream specifies a length-modifying prefix.

3. The apparatus of claim 1, wherein the start mark for each decoded instruction byte indicates whether the decoded instruction byte is the first non-prefix byte of the instruction.

4. The apparatus of claim 1, wherein the end mark for each decoded instruction byte indicates whether the decoded instruction byte is the last byte of the instruction.

5. The apparatus of claim 1, wherein the decode logic is configured to generate accumulated prefix information for each instruction byte of the predetermined number of instruction bytes of the stream.

6. The apparatus of claim 5, wherein the accumulated prefix information indicates all prefix information associated with prefix bytes up to and including the decoded instruction byte, wherein the prefix bytes are within an instruction that includes the decoded instruction byte.

7. The apparatus of claim 5, wherein the accumulated prefix information indicates all prefix information associated with prefix bytes of an instruction that includes the decoded instruction byte, if the start mark of the decoded instruction byte indicates that the decoded instruction byte is the first non-prefix byte of the instruction.

8. The apparatus of claim 1, wherein the predetermined number of instruction bytes of the stream is at least sixteen.

9. The apparatus of claim 1, wherein the decode logic comprises:

first logic, configured to generate an instruction length associated with each instruction byte of the predetermined number of instruction bytes of the stream; and second logic, coupled to the first logic, configured to generate the start mark and the end mark for each of the instruction bytes based on the address/operand size and the instruction lengths received from the first logic.

10. The apparatus of claim 9, wherein the instruction length excludes prefix bytes.

11. In a microprocessor that has an instruction set architecture in which instructions may include a length-modifying prefix used to select an address/operand size other than a default address/operand size, a method for marking the start byte and the end byte of each instruction in a stream of instruction bytes, the method comprising:

during a first clock cycle, decoding each instruction byte of a predetermined number of instruction bytes of the stream to determine whether it is a length-modifying prefix;

if none of the decoded instruction bytes is a length-modifying prefix, generating a correct start mark and a correct end mark for each instruction in the predetermined number of instruction bytes of the stream based on the default address/operand size, during the first clock cycle; and if one or more of the decoded instruction bytes is a length-modifying prefix, generating the correct start mark and the correct end mark for each instruction in the predetermined number of instruction bytes of the stream based on the address/operand sizes indicated by the length-modifying prefixes, during an Nth clock cycle subsequent to the first clock cycle;

wherein N is the number of instructions of the predetermined number of instruction bytes of the stream having at least one length-modifying prefix.

12. The method of claim 11, wherein N is zero if none of the instructions of the predetermined number of instruction bytes of the stream have at least one length-modifying prefix.

13. The method of claim 11, wherein said generating the correct start and the correct end mark for each instruction in the predetermined number of instruction bytes of the stream is performed in N+1 clock cycles, regardless of the number of prefix bytes included in any of the instructions of the predetermined number of instruction bytes of the stream.

14. The method of claim 11, further comprising:

causing the predetermined number of instruction bytes of the stream to be shifted out of an instruction queue:

relative to the first clock cycle, if none of the predetermined number of instruction bytes of the stream is a length-modifying prefix; and relative to the Nth clock cycle subsequent to the first clock cycle, if one or more of the predetermined number of instruction bytes of the stream is a length-modifying prefix.

15. The method of claim 11, wherein the correct start mark indicates the instruction byte that is the first non-prefix byte of the instruction.

16. The method of claim 11, wherein the end mark indicates the last byte of the instruction.

17. The method of claim 11, wherein said decoding each instruction byte of the predetermined number of instruction bytes of the stream comprises:

generating accumulated prefix information for the instruction byte.

18. The method of claim 17, wherein the accumulated prefix information indicates all prefix information associated with prefix bytes up to and including the instruction byte, wherein the prefix bytes are within an instruction that includes the decoded instruction byte.

19. The method of claim 17, wherein the accumulated prefix information indicates all prefix information associated with prefix bytes of an instruction that includes the decoded instruction byte, if the correct start mark indicates that the decoded instruction byte is the first non-prefix byte of the instruction.

20. The method of claim 11, wherein the predetermined number of instruction bytes of the stream is at least sixteen.

21. The method of claim 11, wherein said decoding each instruction byte of the predetermined number of instruction bytes of the stream comprises:

generating an instruction length associated with each instruction byte of the predetermined number of instruction bytes of the stream; and generating a start mark and an end mark for each of the instruction bytes based on the address/operand size and the instruction lengths.

22. The method of claim 21, wherein the instruction length excludes prefix bytes.

23. A computer program product for use with a computing device, the computer program product comprising:

a non-transitory computer usable storage medium, having computer readable program code embodied in the medium, for specifying, in a microprocessor that has an instruction set architecture in which instructions may include a length-modifying prefix used to select an address/operand size other than a default address/operand size, an apparatus configured to mark the start byte and the end byte of each instruction in a stream of instruction bytes, the computer readable program code comprising:

first program code for specifying decode logic, configured to decode each instruction byte of a predetermined number of instruction bytes of the stream and determine whether each instruction byte specifies a length-modifying prefix, the start of an instruction, or the end of an instruction, the decode logic generating instruction start and end marks based on an address/operand size; and second program code for specifying operand/address size logic, coupled to the decode logic, configured to provide the default operand/address size to the decode logic to use to generate the start and end marks during a first clock cycle during which the decode logic decodes the predetermined number of instruction bytes, wherein if during the first clock cycle and any of N subsequent clock cycles the decode logic indicates that one of the predetermined number of instruction bytes of the stream specifies a length-modifying prefix, the operand/address size logic is further configured to provide to the decode logic on the next clock cycle the address/operand size specified by the length-modifying prefix to use to generate the start and end marks;

wherein N is the number of instructions of the predetermined number of instruction bytes of the stream having at least one length-modifying prefix, wherein N is zero if none of the instructions of the predetermined number of instruction bytes of the stream have at least one length-modifying prefix; and wherein the apparatus is configured to generate the correct start and end mark for each of the instruction bytes in N+1 clock cycles, regardless of the number of prefix bytes included in any of the instructions of the predetermined number of instruction bytes of the stream.

* * * * *